United States Patent

[11] 3,594,552

[72] Inventors Robert G. Adamson;
 Paul W. Thiede, both of Danville, Ill.
[21] Appl. No. 722,095
[22] Filed Apr. 17, 1968
[45] Patented July 20, 1971
[73] Assignee Hurletron Incorporated
 Danville, Ill.
 Continuation-in-part of application Ser. No. 621,943, Mar. 9, 1967, now Patent No. 3,468,201, dated Sept. 23, 1969.

[54] SYSTEM AND METHOD FOR INDICATION AND CONTROL OF CIRCUMFERENTIAL REGISTER
 29 Claims, 30 Drawing Figs.
[52] U.S. Cl. .................................................... 235/92 MP,
 235/29 DN, 101/181
[51] Int. Cl. ..................................................... G06m 3/02,
 B41f 33/02
[50] Field of Search .......................................... 101/181;
 235/92

[56] References Cited
UNITED STATES PATENTS

| 3,068,787 | 12/1962 | Dall'Oglio | 101/181 |
| 2,497,909 | 2/1950 | Poole | 101/181 |
| 3,178,562 | 4/1965 | Acker | 235/92 |

Primary Examiner—Daryl W. Cook
Assistant Examiner—Robert F. Gnuse
Attorney—Hill, Sherman, Meroni, Gross & Simpson ABSTRACT: A system is disclosed for indicating and controlling register between repetitive patterns of work applied to a moving web, wherein a digital encoder is rotated in synchronism with rotation of work-performing members, and by counting encoder pulses any error in register at respective work stations may be displayed and/or utilized for automatic control purposes. Counter circuitry is utilized both to facilitate set up of the system and to provide a precisely adjustable digital set point for error determination in operation. Provision is made for a high error sampling rate for automatic control and a lower error sampling rate for digital display. A digital display of average error is an alternative to a lower error sampling rate.

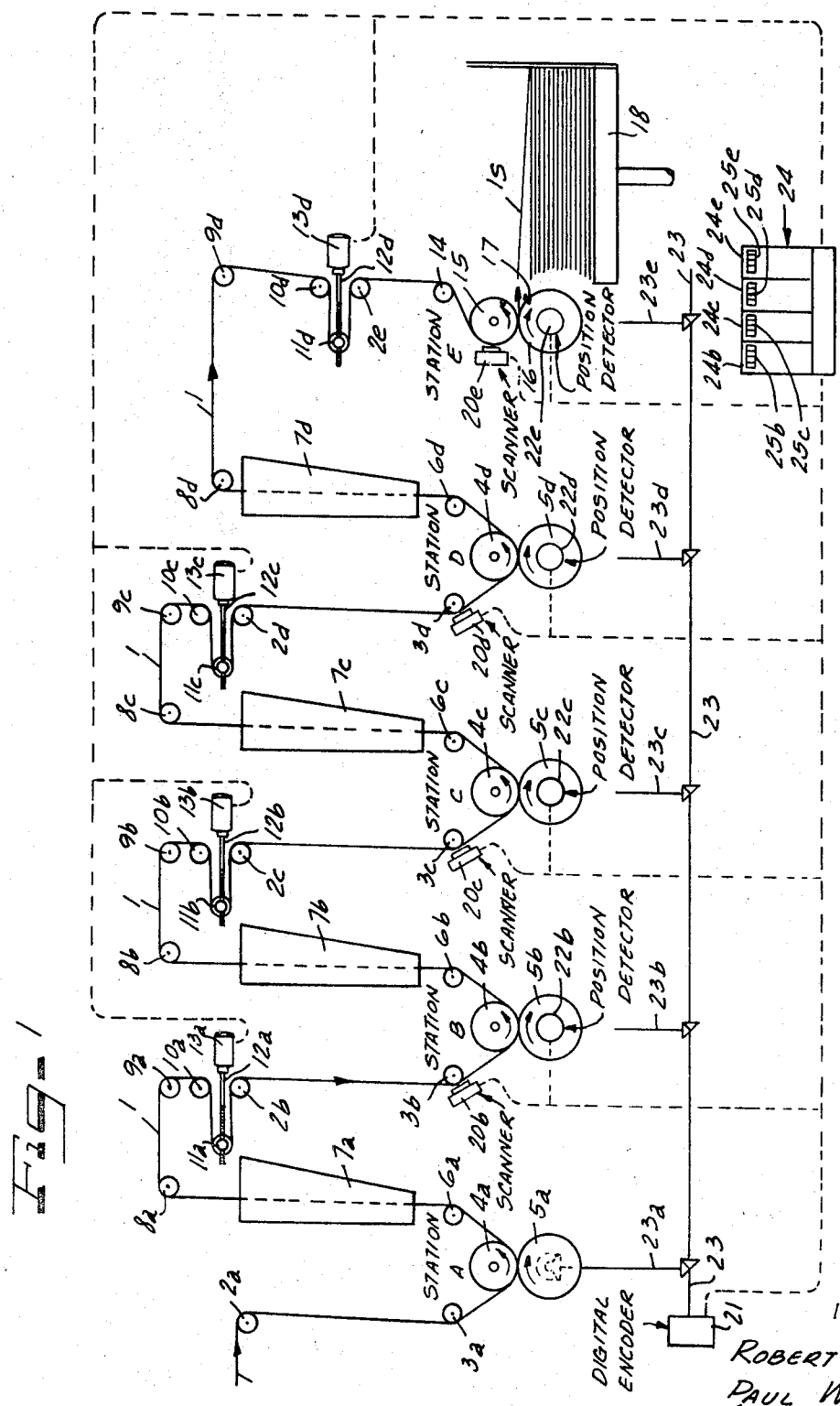

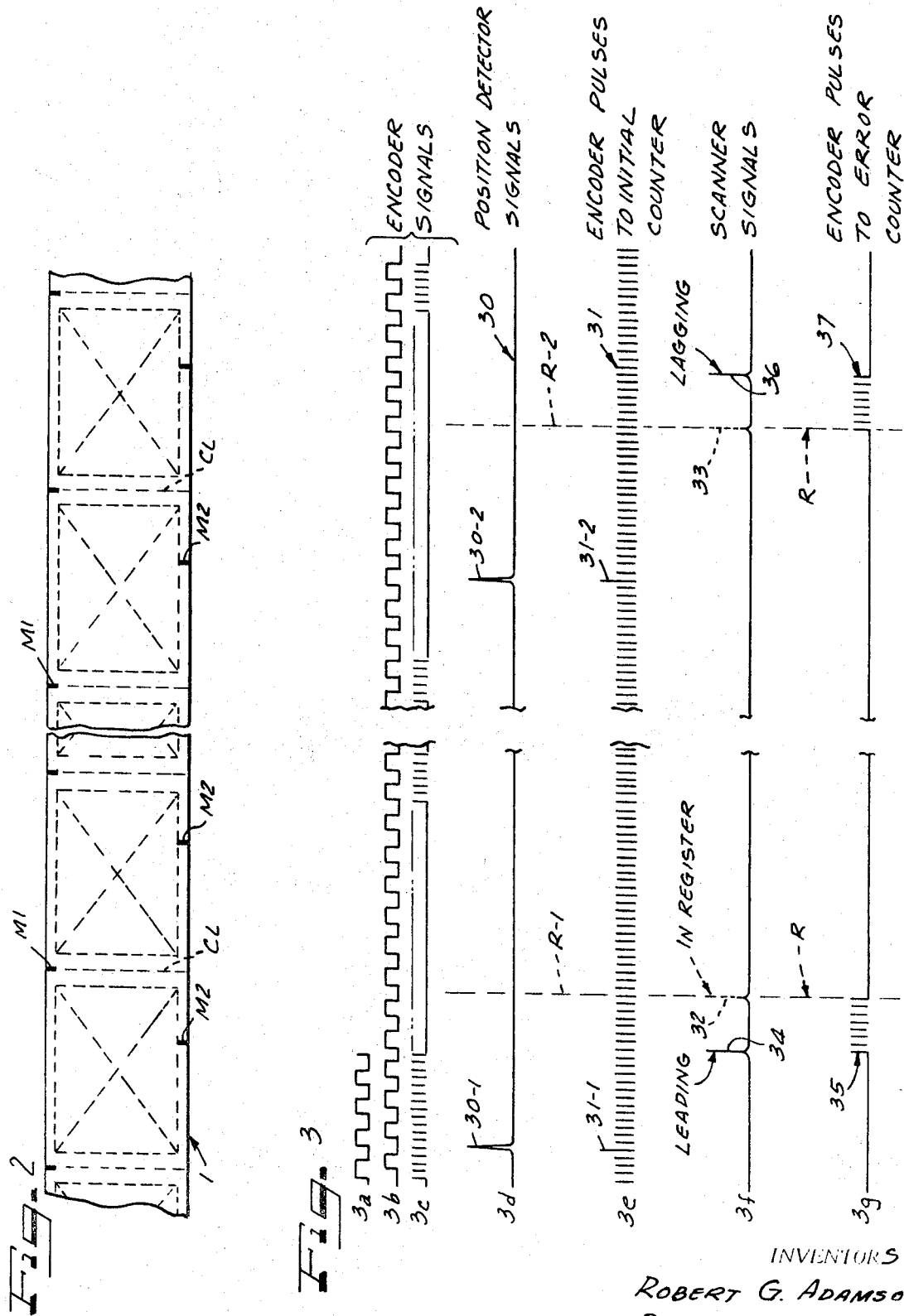

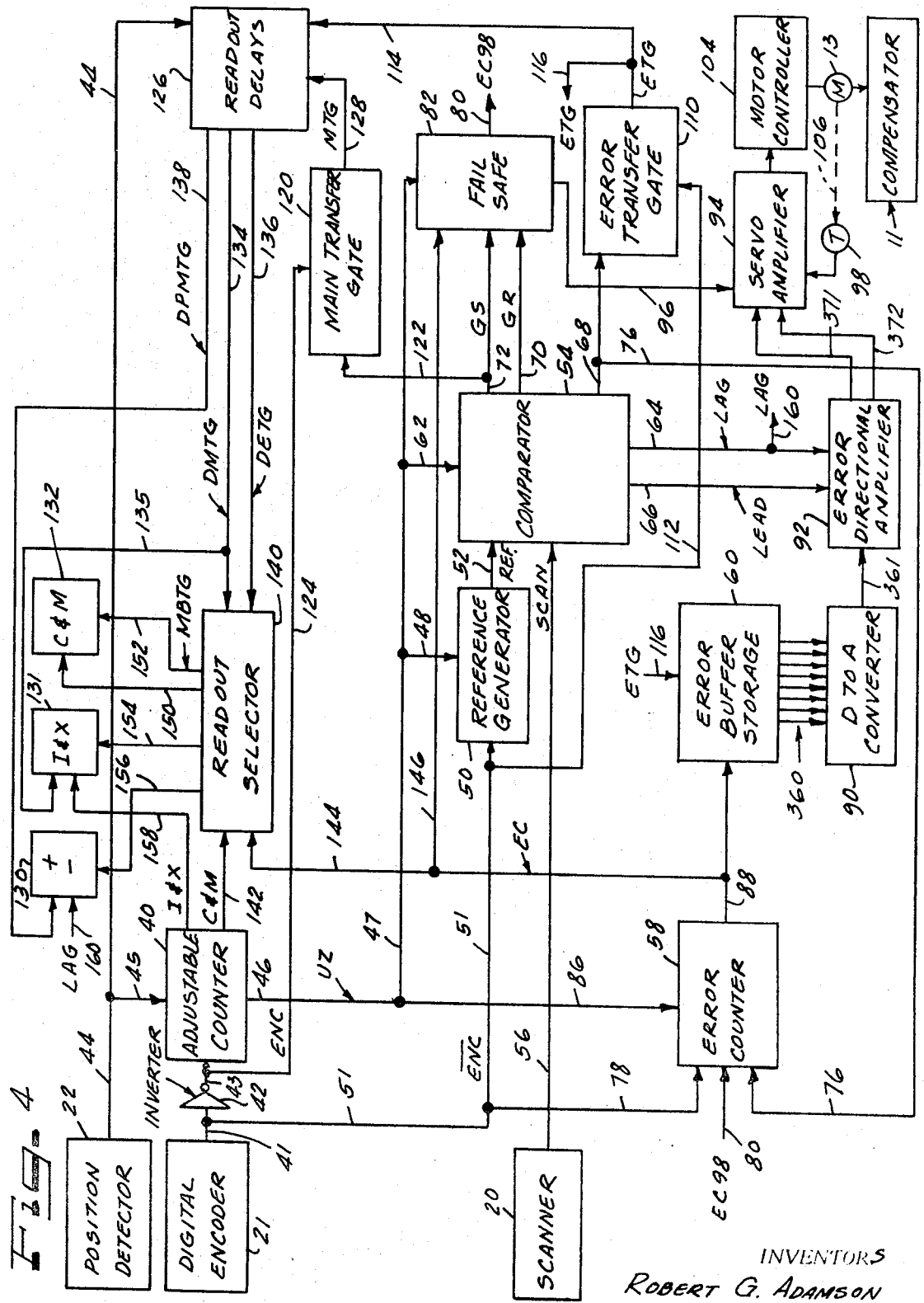

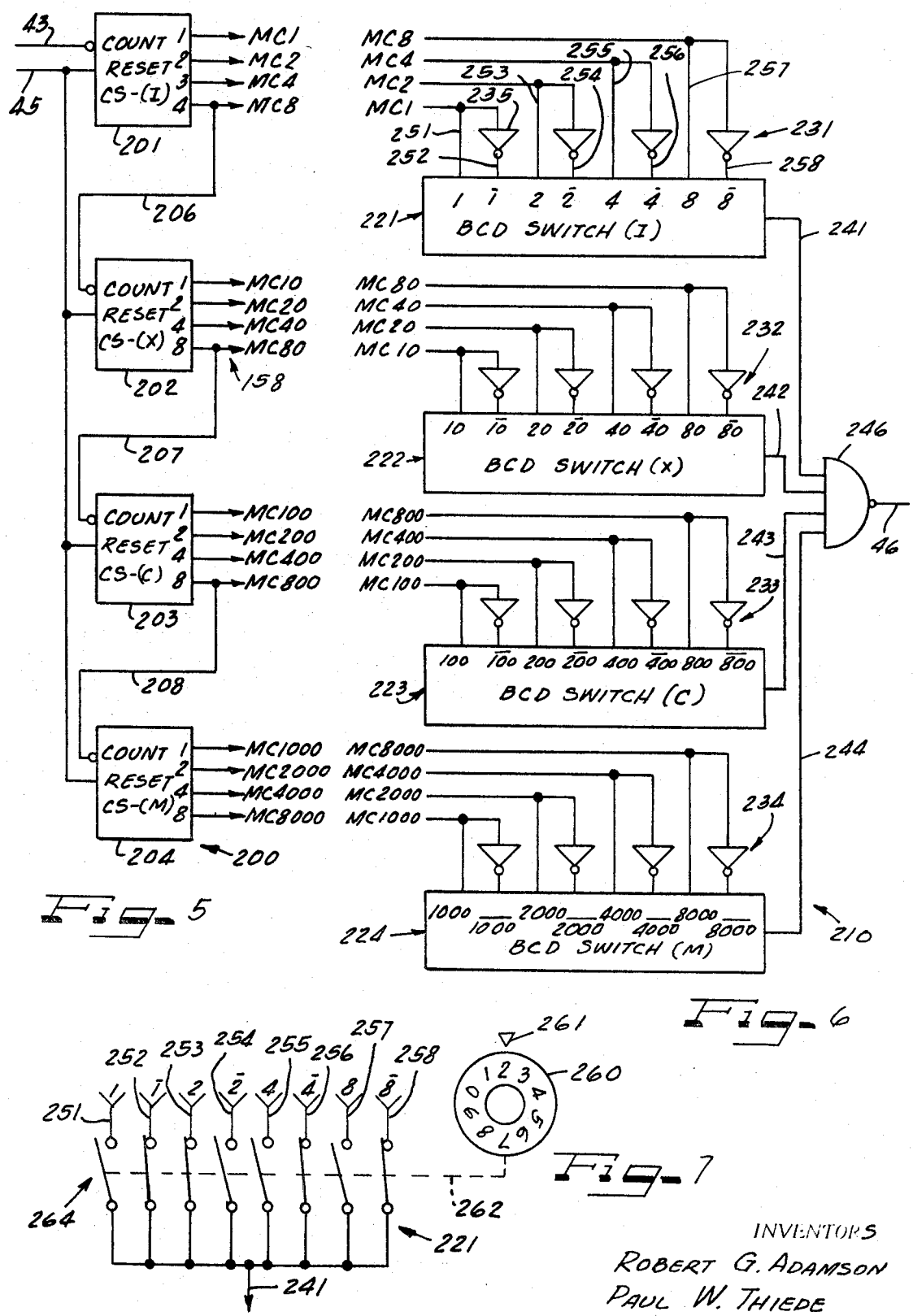

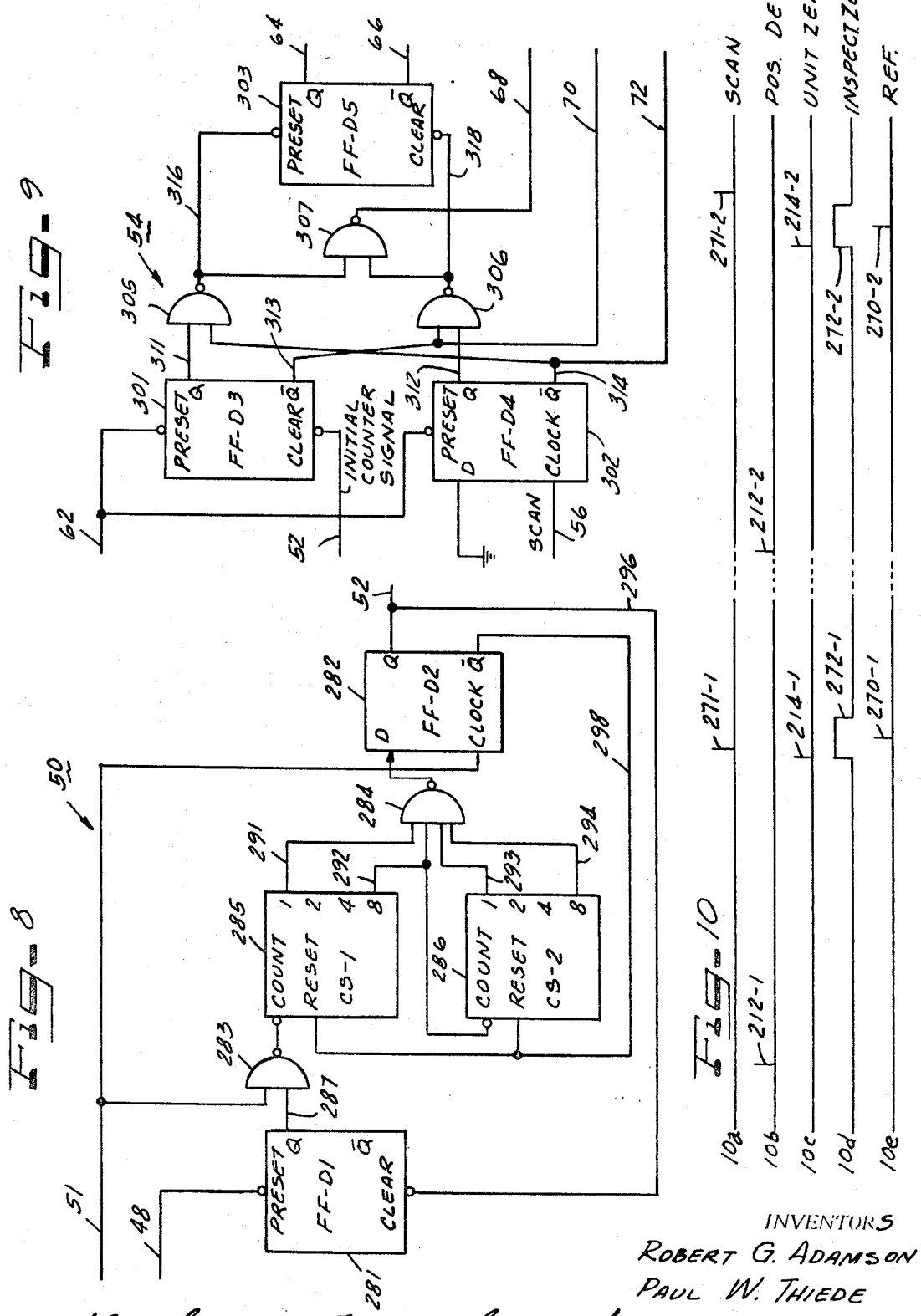

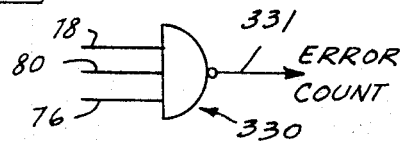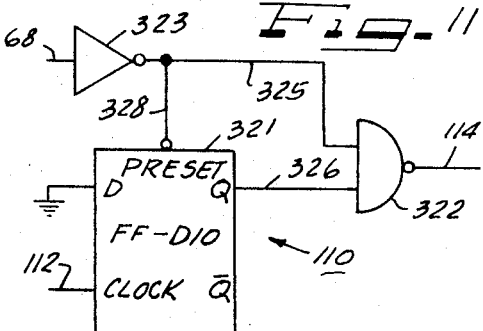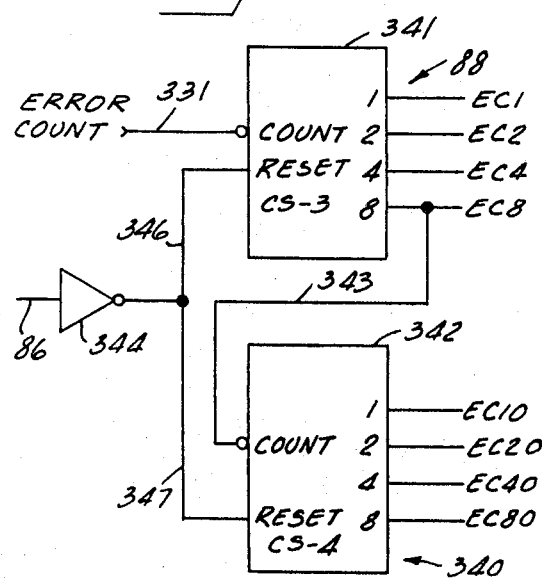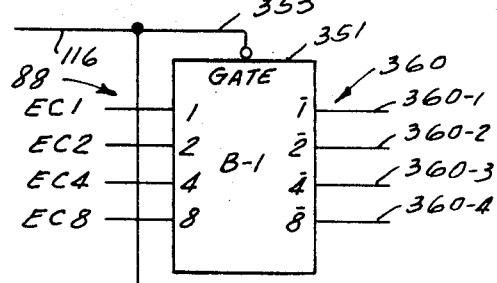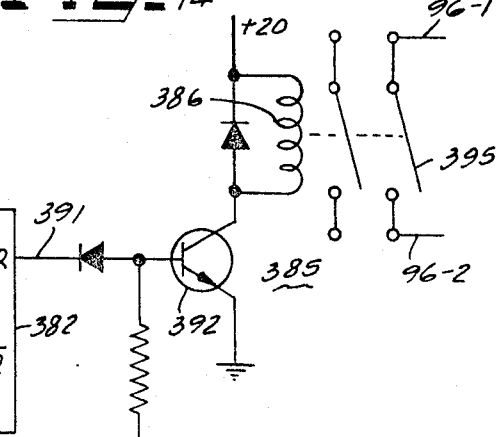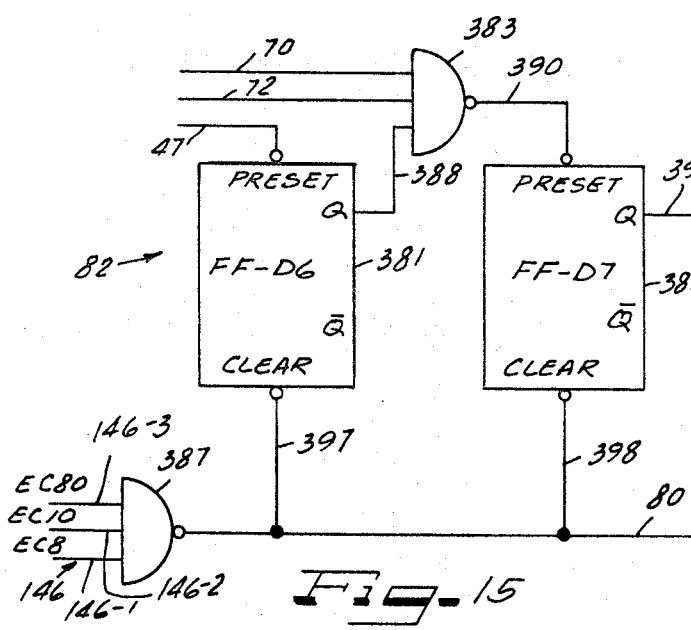

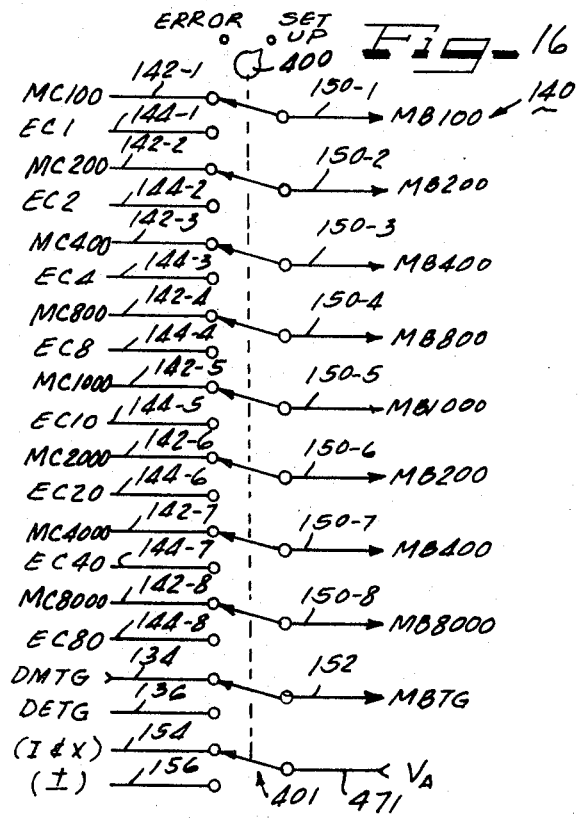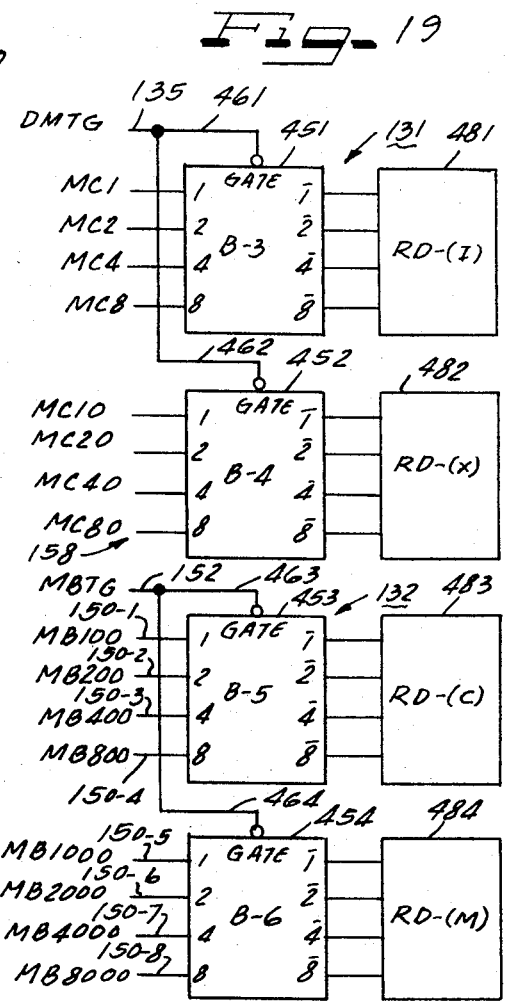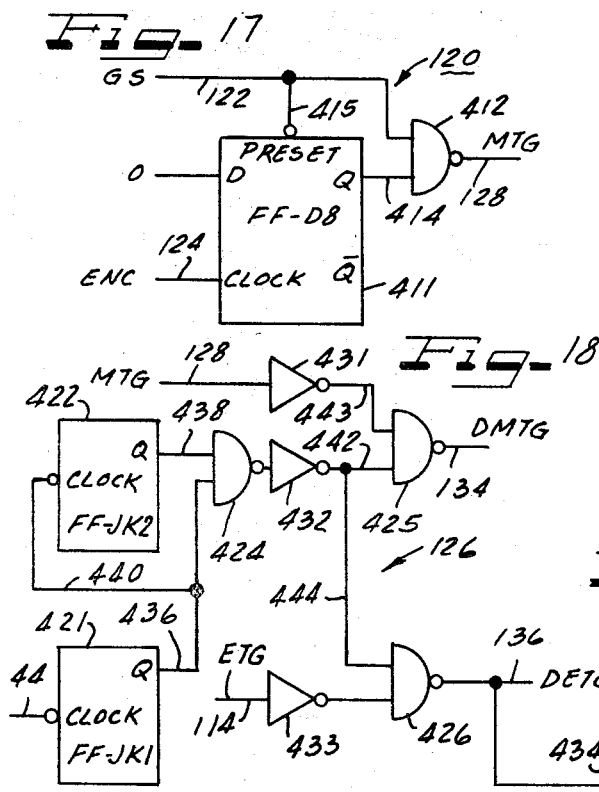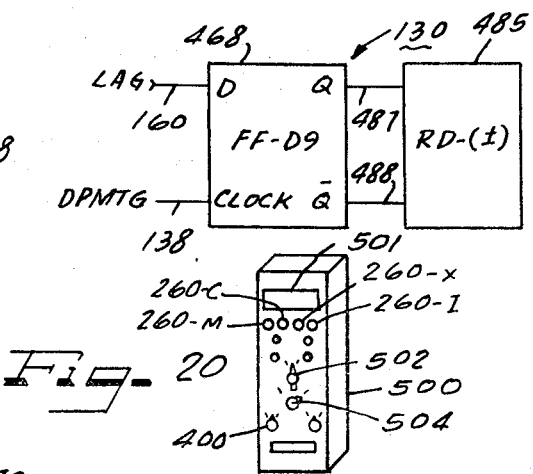

SYSTEM AND METHOD FOR INDICATION AND CONTROL OF CIRCUMFERENTIAL REGISTER

CROSS-REFERENCES TO RELATED PATENTS AND APPLICATIONS

This application is a continuation-in-part of our copending U.S. application Ser. No. 621,943, filed on Mar. 9, 1967, now U.S. Pat. No. 3,468,201, issued Sept. 23, 1969, and assigned to the assignee of this application, and the disclosure of such copending application is incorporated herein by reference in its entirety.

Reference is also made to United States Letters Patent 3,120,181 and to U.S. Application Ser. No. 637,263 filed May 9, 1967, both assigned to the same assignee as the present application, for a disclosure of recent advantages in the same field of endeavor, and for introductory discussions which will provide the general background of the invention herein disclosed.

SUMMARY OF THE INVENTION

The automatic control of register between separately applied patterns of work is commonly required in the graphic arts, for example where it is applied to repetitive operations performed on a moving web of such materials as paper, paperboard, plastic film, metal foil, and the like, to laminates of any such materials. The operations in which such control is advantageous include printing in two or more colors, the insetting of preprinted webs in newspapers, newspaper sections, supplements and the like, cutting, creasing, folding, notching, perforating, embossing and the like, in register with prior printing or with any other previously applied work on the web.

The features of the invention are particularly intended for use in and are readily applicable to each and all operations of the general nature of those above mentioned.

Whether employed for measurement and visual indication only or for automatic control of register as well, the invention provides a meaningful, digitalized, and readily understood visual measurement of the existing condition of register. The register error measurements are readily precisely calibrated with the circumferential positions of the respective rotary work-performing members and are not rendered inaccurate by the frequent changes which occur in the speed of work-performing members and the speed of the web.

As applied to automatic control, the invention provides precise correction of both relatively large and relatively small register errors, the corrective action being responsive to analog signals which are directly proportional in amplitude to the numerical value of the digital measurement of the error in register and, hence, to the magnitude of the error.

It is an object of this invention to provide both an improved and economical registration system and method.

It is another object of this invention to provide a system or method for generating a digital error signal related to the dimensional misalignment of two moving parts.

It is another object of this invention to provide a system and method of providing for the convenient introduction and adjustment of a digital set point representing the proper register between two moving parts.

It is still a further object of this invention to provide a versatile registration system which is operable to provide adjustment for widely varying types of components by means of simple digital-type selection.

It is also an object of this invention to provide apparatus in a web registration system for detecting the failure of certain signals to appear within a certain predetermined limits.

Other objects, features and advantages of the present invention will become apparent to those skilled in the art from the following description taken in connection with the accompanying drawings which illustrate a preferred embodiment.

BRIEF DESCRIPTION OF THE DRAWINGS

FIG. 1 is a diagrammatical illustration of a multiple station web registration system and method in accordance with the present invention;

FIG. 2 is a fragmentary diagrammatic view of a portion of the web produced by the system and method of FIG. 1;

FIGS. 3a through 3g (collectively designated FIG. 3) diagrammatically indicate a series of waveforms useful in explaining the basic concepts of the present invention;

FIG. 4 shows a block diagram of an overall web registration control and error display system in accordance with the present invention such as may be utilized to control web registration at one of the stations of FIG. 1;

FIG. 5 shows a circuit diagram for a main counter which is part of the adjustable counter component of FIG. 4;

FIG. 6 shows a circuit diagram for a unit zero generator which is part of the adjustable counter of FIG. 4;

FIG. 7 shows detail of the BCD switch component of FIG. 6;

FIG. 8 shows a circuit diagram for the reference generator component of FIG. 4;

FIG. 9 shows a circuit diagram for the comparator component of FIG. 4;

FIGS. 10a through 10e (collectively designated FIG. 10) show a series of waveforms illustrating the operation of the system of FIG. 4;

FIG. 11 is a circuit diagram for the error transfer gate component of FIG. 4;

FIG. 12 is a circuit diagram showing an input gate for the error counter component 58 of FIG. 4;

FIG. 13 is a circuit diagram of the counter component of the error counter 58 of FIG. 4;

FIG. 14 is a circuit diagram for the error buffer storage component 60 of FIG. 4;

FIG. 15 is a circuit diagram for the fail-safe component 82 of FIG. 4;

FIG. 16 is a circuit diagram for the readout selector component 140 of FIG. 4;

FIG. 17 is a circuit diagram for the main transfer gate component 120 of FIG. 4;

FIG. 18 is a circuit diagram for the readout delays component of FIG. 4;

FIG. 19 is a circuit diagram for the display components of FIG. 4; and

FIG. 20 is a diagrammatic perspective view illustrating a typical control panel for the subject system.

DESCRIPTION OF THE PREFERRED EMBODIMENTS

Introductory General Description

By way of introduction to the illustrated embodiment, a system will first be described and its operation explained for an embodiment involving only two successive work operations on a moving web. The first of these operations is the application of a printed pattern to the web and the second is a web cutoff operation to be performed with the cut line midway between the terminus or trailing edge of each of the printed patterns and the start or leading edge of the next successive pattern in the line of web travel. The first work-performing member is a printing cylinder and the second work-performing member is a rotary cutting cylinder.

In common with prior register control systems, the present system utilizes a recurrent indicium, commonly termed a register mark, carried by the web as a point of reference to the location of the web of the entire pattern of work applied by the member which prints or otherwise applied the mark. In this instance the mark is printed on the web by the printing cylinder which applies the printed pattern to which the cut is to be controlled.

Also, in prior systems, the occurrence of the indicia or register marks is detected, at one or more selected points downstream along the path of web travel from the locus in which they are applied to the web, by a photoelectric device termed a scanner. The scanner generates an abrupt electrical signal upon the arrival of each recurrent register mark at the scanning position. The present system utilizes one or more such scanners, one for each operation to be controlled, excluding the operation which applies the register mark.

In this instance, only one scanner is required and it is positioned along the path of web travel at a location preferably close to and upstream from the locus of the cutting operation. Upon the arrival of each recurrent register mark at the scanner, the rotational position of the cutting cylinder is determined, as will be later explained, to ascertain whether the cutting knife of that cylinder is or is not then in such position that it will sever the web in proper space relationship to the printed pattern. The actual cutting may occur at a subsequent point in the rotation of the cutting cylinder. For example, the register mark may be placed on the desired cut line, in which case, to be in register, cutting should occur when the register mark observed by the scanner ahead of the cutting cylinder reaches the latter.

Unlike prior systems of this type, the present system utilizes a rotary, digital encoder and encoder pulse counters as means of measuring the magnitude of detected errors in register. Also, a readout is preferably provided for a selected plurality of measurements. The encoder generates a uniform number of electrical impulses for each uniform, small arc of its rotation, regardless of its rotational speed. It is run in synchronism with the printing and cutting cylinders, preferably by directly coupling it with one of these cylinders. Thus, a uniform number of pulses is generated for each small angle of rotation of the cutting cylinder and each encoded pulse represents a predeterminable, definitive, small arc of travel of the surface of the cutting cylinder.

As a specific example, let us assume that the cutting cylinder has a 20-inch circumference, makes one cut per revolution, and that the encoder runs 1:1 with this cylinder and generates 20,000 pulses per revolution. Under these conditions, each encoder pulse represents 0.001 inch of travel on the cylindrical surface of the cylinder. Obviously, if the cylinder were 40 inches in circumference, each pulse would represent 0.002 inch of travel of its surface, or on a 30-inch cylinder each pulse would represent 0.0015 inch of travel, and so on.

It is characteristic of operations of the type to which the present invention is addressed that, in traveling through a locus in which a repetitive pattern of work is applied to a web, the latter is propelled at a linear speed corresponding to the peripheral speed of the work-performing member. Under satisfactory operating conditions, any difference in their speed is so minute that it is not detectable by tachometers or the like. With this in mind, it is apparent that a count of the encoder pulses generated during any time interval is a direct indication of the distance traversed by the web during that interval, regardless of web speed. Therefore, the use of an encoder in the manner herein provided is simpler, more direct, and more reliable method and means of obtaining meaningful, digital pulses for the measurement of register errors than is the use of a multivibrator having a pulse rate which, to be meaningful, must be adjusted to varying web speeds.

In the present system, a simple form of rotary cylinder position detector, which is preferably photoelectric, is employed to produce an abrupt electrical impulse at one and the same point in each revolution of the work-performing member to which it is coupled or with which it is otherwise driven synchronously. In the particular application of the system now being considered, the cylinder position detector is driven 1:1 with the cutting cylinder and preferably is directly coupled thereto. It may, when desired, be on the same driven shaft as the encoder.

The signal produced by the cylinder position detector occurs when the cutting cylinder reaches an angle of rotation which puts the cutting knife at the same constant, predeterminable distance, measured on the circumference of the cutting cylinder, from the position the knife will be in when it severs the web. Thus, when its signal occurs, the cut will be made upon the occurrence of a definite and constant number of encoder pulses. The time interval between occurrence of the signal and severing of the web will vary with web speed, but this has no significance in the present system since the distance which the knife must travel before making the cut is measured in terms of encoder pulses and their number is a function of the distance traveled by the web rather than its linear speed.

For convenience in identification, the signal produced by the cylinder position detector each revolution of the cutting cylinder will be called a position detector signal. It functions to start a counter, herein identified as the Initial Counter, which counts the encoder pulses generated after occurrence of the position detector signal during each revolution of the cutting cylinder. As this count reaches a certain value, which is predetermined during setup of the operation, the web will be cut. The setup procedure is also such, as will be later explained, that if the signal from the scanner occurs at the same instant that the Initial Counter has reached the predetermined count, the cut will be made in the desired relationship on the web with the printed pattern, the position of the latter being represented, as will be recalled, by the register marks. If the scanner signal occurs before the predetermined count has been reached by the Initial Counter, the cut will be out of proper register with the printing in one direction. If the scanner signal occurs after the predetermined count has been reached, the cut will be out of register with the printing in the opposite direction.

The magnitude of the error in register between the printing and the cut is a direct and linear function of the number of encoder pulses which are generated between the occurrence of the scanner signal and the occurrence of the predetermined count at the Initial Counter, regardless of which is first to occur. As previously noted, the number of encoder pulses counted between these events, and hence the register error, has a definite relation to cylinder circumference and readily can be interpreted in thousandths of an inch or in millimeters, microns, or any other desired unit of measurement.

Preferably, another pulse counter, which we will designate as the Error Counter, is started upon and by either the occurrence of the scanner signal or the occurrence of the predetermined count on the Initial Counter, whichever first occurs. When started by the scanner signal, the count on the Error Counter is terminated upon and by the occurrence of the predetermined count on the Initial Counter. When started by the occurrence of the predetermined count on the Initial Counter, the count on the Error Counter is terminated upon and by the occurrence of the scanner signal. Thus, the count of the Error Counter upon each revolution of the cylinders represents the magnitude of the error in register during that revolution and the direction of the error is positive or negative (i.e., in a leading or lagging direction) depending upon whether the count was started by the occurrence of the scanner signal or the occurrence of the predetermined count by the Initial Counter.

To provide a visual indication of the measured error in register, the number of pulses counted by the Error Counter is supplied to any required number of decimal display tubes, depending upon whether the count to be displayed is in units, tens, hundreds, or thousands, each tube displaying only one digit of from zero to nine, inclusive.

In most operations with which the invention has its greatest utility, the speed of the web is often so great, under normal operating conditions, that it may be difficult visually to follow readings of the digital display tubes on which the error counts appear when each consecutive error measured is displayed. In such instances, the count displayed may be the average of the measured errors over several consecutive measurements. It is quite convenient to display the average of two, three, four or more consecutive error measurements.

In addition to the digital display tubes which indicate the magnitude of the register error, another display tube is preferably provided which displays only a positive or negative sign, depending upon the direction of the error as determined by whether the scanner signal occurred before or after the Initial Counter reached its predetermined count. Obviously, when the average of several errors in register is displayed, one or more of the measured errors in register may be opposite in its direction to the other measured errors. In such cases the tube which displays the positive or negative sign is given the proper impulse to display the sign which applies to the average. To accomplish this, the counter employed for obtaining the average is of the up-down type (i.e., both additive and subtractive).

For the sake of economy, the error count may be sampled at suitable intervals to provide the lower readout frequency required for visual display, rather than sampling the error in each cycle and displaying the average error at the lower readout frequency. A system using sampled error display is shown in the accompanying drawings.

The pulses from the Error Counter are supplied to a simple form of electronic computer from which are derived analog output (or command) signals having a potential directly proportional to the error count and hence, to the magnitude of the error in register. If the sign is negative, indicating that the cut-to-print register error is in a lagging direction, the computer gives a negative polarity analog output signal. If the sign is positive, indicating that the cut-to-print register error is in a leading direction, the computer gives a positive polarity to the analog output signal.

The computer output signals are supplied to and govern the speed and direction of motivating means for any conventional type of compensating device by which the errors in register are corrected. For example, a web compensator may be employed to lengthen and shorten the web lead between the cylinder which applies the register mark and the cutting cylinder, in this instance. Alternatively, when the cutting cylinder or other rotary member which applies a pattern of work to be controlled is driven through planetary or epicycle gearing with means for changing the ratio between its input and output when a correction shaft is rotated, this may be employed for the automatic correction of register errors by attaching reversible motivating means to the correction shaft and operating the motivating means in response to the computer output signals.

In the preferred embodiment of the invention, the motivating means for the compensating device is a reversible electric motor of low inertia, which runs at a speed varying directly with the applied voltage and in a direction which changes with the polarity of the signals from the computer. As an alternative, a hydraulic or a pneumatic motor, or even a reversible air cylinder or hydraulic cylinder may be used as the compensator motivating means. In such cases the output signals from the computer are supplied to a suitable servo valve of well-known form which regulates the flow of fluid to the motor or cylinder from an hydraulic pump or air compressor and which reverses the direction of flow through the motivating means with reversal of the polarity of the computer output signals.

It will be readily apparent to those familiar with the art that the system herein provided may be applied to the detection and measurement and, when desired, also to the automatic control of register between any desired number of sequentially performed operations by providing a unit of control and/or detection and measurement for each such operation other than that in which the register mark is applied to the web, plus certain components which serve all of the units. This is exemplified by FIG. 1 of the accompanying drawing.

DESCRIPTION OF FIGS. 1—3

Referring now to FIG. 1 of the drawing, there is illustrated, in diagrammatic form, a rotogravure printing press in which four colors may be applied to one side of the web and with provision for cutting the printed web into sheets. The four successive printing units are designated as Stations A, B, C and D, and the cutoff unit is designated as Station E. In this instance the invention is utilized automatically control circumferential, color-to-color register between the patterns applied to the web 1, at each of the printing stations, and to sever the web in Station E, in register with the composite printed copy.

Web 1, which may be paper, paperboard, plastic film, metal foil, or the like, or a laminate of any two or more such materials, is drawn from a roll thereof on a suitable reel or roll stand, not shown, and passes over idler rollers 2a and 3a, and thence between impression cylinder 4a and the gravure printing cylinder 5a, in firm contact with both. The web is then directed over idler roller 6a to a dryer 7a of any desired, conventional form, where the inked pattern applied thereto at the impression formed between cylinders 4a and 5a is heat set or dried. Upon leaving the dryer, the web passes over idler rollers 8a and 9a to the web compensator mechanism comprising idler roller 10a, the movable compensator roller 11a, and idler roller 2b to printing Station B.

In the drawing, at the Stations A, B, C and D, corresponding parts are designated by the same reference numerals, suffixed respectively by letters a, b, c and d. The web 1, after receiving the pattern printed at Station A, which includes a register mark, as will be shown later, passes in succession through Stations B, C, and D in the same manner as above described with reference to Station A.

At each of the Stations B, C, and D, the web receives a printed pattern in addition to that applied at Station A. To obtain the desired results in the final composite copy, each of the separately applied patterns must be held in proper space relationship (register) on the web to each other. Normally, in a four-color operation such as here illustrated, Station A will print a pattern in yellow ink, Station B in red, Station C in blue and Station D in black. The final composite copy may have areas of any or all of these individual colors and may also have areas in which any two or more of these individual colors are combined to form such composite colors as, for example, orange, green, purple, brown, etc.

From printing station D, the web 1, now carrying the four-color copy, is directed as shown through the compensating device comprising idler roller 10d, the movable compensating roller 11d, and idler rollers 2e and 14, to the cutoff station E where it takes a substantial wrap around cylinder 15 and thence between this cylinder and cutting cylinder 16. Cylinder 16 carries a knife 17 which, in the case illustrated, severs the web once per revolution of cylinder 16. The severed sheets, designated as 1s, are propelled by cylinders 15 and 16 onto a suitable collecting table 18 where they are formed into a neat pile with their edges aligned. Preferably the table 18 is lowered and raised, as required, by suitable means not shown, such as a hydraulic or pneumatic cylinder connected to shaft 19.

Referring momentarily to FIG. 2, here is represented a length of the printed web 1 carrying the composite printed patterns, which are diagrammatically illustrated by the dotted lines. In the case illustrated, the web is to be severed substantially midway between the leading and trailing edges of adjacent printed patterns and the location of the cuts to be made subsequently are indicated by dashed lines CL. The first color printed (at Station A in FIG. 1) includes the register marks indicated at M1 in FIG. 2, which are placed on the cut lines CL. or, alternatively, similar register marks may be applied to the web, preferably but not necessarily in a clear track (devoid of other printing) along the length of the web, such as an edge margin. Marks M2 represent one such alternative location.

Returning to FIG. 1, a photoelectric scanner 20b is mounted adjacent idler roller 3b to detect the recurrent register marks relatively close to the printing impression of Station B and provides an abrupt electrical signal upon each occurrence of a mark at the scanned location. Identical or similar scanners indicated at 20c, 20d, and 20e perform the same function ahead of the respective Stations C, D and E. The signals from each of the scanners are supplied, as indicated by the dotted lines in FIG. 1, to a control center or console 24 comprising the units 24b, c, d and e, the function of which will be explained later.

The dotted lines represent multiple insulated wire cables or conduit runs rather than individual conductors, as will be apparent from the subsequently described circuit diagram.

To each of the printing cylinders 22b, c and d, and to the cutting cylinder 16, a cylinder position detector, designated respectively as 22b, c, d and e, is directly coupled to and runs at the same rotational speed as the cylinders. Each of these detectors provides an abrupt electrical signal once per revolution of the cylinder to which it is coupled. The signal from each detector occurs at a predetermined, fixed angle of rotation of the cylinder with respect to the angle of rotation which that cylinder should assume, to maintain register, when a register mark occurs at the preceding scanner. Thus, when a scanner signal occurs, the signal from its companion cylinder position detector should occur either before or after that detector has rotated through a definite, predetermined angle. This required angle of rotation, it will be recalled, is represented by definitely known number of pulses from the encoder. Signals from each of the cylinder position detectors are supplied, as indicated by the dotted lines, to the control center or console 24, as are the signals from the scanners.

In the case illustrated, a common drive shaft 23, powered by suitable motivating means not shown, is connected through the shafts 23a, b, c, d and e to the respective cylinders 5a, b, c, and d, and to cylinder 16, whereby these cylinders are rotated in unison at the same peripheral speed. To avoid complexity in the drawing, the complete connection of only shaft 23a to line shaft 23 and printing cylinder 5a is shown. The other shafts 23b, c, d and e are similarly connected through suitable gearing to their respective cylinders as well as to shaft 23. With this drive arrangement, it is convenient, as shown, to drive the encoder 21 directly from shaft 23, although it may be coupled instead directly to any one of the cylinders 5a, b, c or d or 16 and still run, as desired, in synchronism with all of these cylinders.

As previously explained, the encoder generates a continuous train of pulses, each of which represents a uniform but very small increment (angle) of rotation of shaft 23 and, hence, of the printing and cutting cylinders. This train of encoder pulses is supplied to the console 24, as indicated by the dotted line connecting encoder 21 with the console.

In the circuitry provided within the console 24, separate, identical sections, one of which will be later described, serve each of the Stations B, C, D and E. These separate sections are designated, respectively, by the reference numerals 24b, c, d and e. The signals from scanner 20b and detector 22b are directed within the console to the section 24b. Those from 20c and 22c are directed to section 24c. Those from 20d and 22d are directed to section 24d, and those from 20e and 22e are directed to section 24e. However, the encoder pulses from 21 serve and are directed to each of the sections 24b, c, d and e.

Each of the sections 24b, c, d and e of the console 24 contains an electronic computer individual to that section and serving the respective Stations B, C, D and E. The manner in which the signals and encoder pulses supplied to the computer of each console section are compared is shown graphically in FIG. 3.

Each console section also contains a digital display device. These are represented at 25b, c, d and e in FIG. 1. In the specific instance illustrated, the display devices may each be considered as comprising five electronic display tubes. Four tubes of each device display a digit of from zero to nine, inclusive. All four digit display tubes are used during setup, but the fifth error polarity display tube is inactive. In normal operation, the two most significant digits of the error counts are displayed. The fifth display tube of each group of five will show a plus sign when the work applying cycle to which the numerical value of the display applies is longer than the distance on the web between the register marks. The display of a negative sign indicates that the work interval involved is shorter than the distance on the web between the register marks. When there is no register error, no sign is displayed.

At the web speeds normally encountered in operations of the type to which the invention is particularly addressed, a readout of each individual error count would change too fast to be readily intelligible. Therefore, the illustrated embodiment provides for displaying periodically sampled values of error count. Any desired sampling of individual error counts may be displayed, as may each error count, when desired. In the instance illustrated by the accompanying drawings, every fourth error count is displayed to provide a particularly economical construction.

In the case illustrated, analog output signals are derived in the computer circuits of each of the sections 24b, c, d and e of the console and these signals are supplied, as indicated by the dotted line, to the respective compensator motors 13a, b, c and d. In response to these signals, the motors operate in the proper direction to correct the error in register by lengthening or shortening the path of web travel through the loops formed by the respective compensators.

The compensator motors may be, for example, reversible DC motors which operate in a direction dictated by the polarity (direction of flow) of the current supplied thereto and at a speed proportional to the applied voltage. The motors 13a, b, c, and d are connected, respectively with the movable compensator rollers 11a, b, c, and d by the respective helical screws 12a, b, c and d, to move these rollers along the screws. Of course these rollers are suitably guided in their path of travel by well-known means not shown and, normally, a suitable set of reduction gears within or exterior to the motor case causes the screws to operate at lower speed than the armature speed of the motors.

Referring now to FIG. 3, the square wave patterns shown in FIGS. 3a and 3b of the diagram represent two separate continuous trains or channels of such waves generated by the encoder 21 of FIG. 1. It should be noted that the relative occurrence of the individual square waves in the separate trains is such that their edge portions, representing abruptly rising and descending potentials, comprise a series of uniformly spaced individual impulses which are four times as great in number as the individual square waves in each train. Thus, with an encoder which provides two such trains each containing 1,250 individual square waves per revolution of the encoder, the arrangement provided gives 5,000 countable impulses per revolution. This multiplication of impulses is graphically illustrated by FIG. 3c.

FIG. 3d represents the output from the cylinder position detector serving each particular unit of the system (such as detector 22b for Station B, 22c for Station C, etc.). During most of each 360° of its rotation, the detector supplies no signal (i.e., its output voltage is zero, as represented by the horizontal base of waveform 30 of FIG. 3d). But once and at the same angle during each revolution of the detector it provides an abrupt signal of rapidly rising and descending potential, as illustrated at 30–1 and 30–2 in FIG. 3d, such signal occurring once per revolution of the signal generator.

FIG. 3e, being similar to FIG. 3c, represents the encoder impulses transmitted to and counted by the Initial Counter of each unit of the system. In FIG. 3e, the pulses such as 31–1 and 31–2 of waveform 31 which are shown as extending higher than those adjacent to them represent a clearing and resetting of the Initial Counter to zero, this occurring once during each revolution of the cylinder position detector. This clearing and resetting to zero coincides with and is the result of occurrence of the abrupt impulses, such as 30–1 and 30–2 of FIG. 3d, which are transmitted to the Initial Counter of each unit of the system from the cylinder position detector which serves this unit. This coincidence is indicated by the vertical alignment of pulses 30–1 and 30–2 of waveform 30 with the clearing and resetting occurrences at 31–1 and 31–2 of waveform 31. The relationship of other events indicated in the several parts of FIG. 3 is similarly shown by their relative positions along a horizontal axis.

While the encoder impulses are shown in FIGS. 3c and 3e as being uniformly spaced, it should be clearly understood that they are uniformly spaced with respect to the elapsed time between their occurrence only at constant web speed. As previously mentioned, the spacing between pulses represents a small and uniform angle of rotation of the encoder and of the work-performing member or members with which it is synchronized. Accordingly, the occurrence of each pulse represents a small and uniform increment of web travel, unaffected by changes in web velocity. The same applies to the error signal counts shown in FIG. 3g.

The dashed, vertical lines R-1 and R-2 of FIG. 3 represent the position of the center of register with respect to the position detector pulses 30-1 and 30-2, respectively. For example, as applied to indicating and/or controlling register between the patterns of printing applied at Stations A and B of FIG. 1, the spacing between the position detector pulse 30-1 and the line R-1 represents the length of web which must pass through the impression at Station B, after pulse 30-1 is provided by generator 22b, in order for the patterns applied at Stations A and B to be in register. In operation of the system this condition is known to prevail when occurrence of the pulse from scanner 20b coincides with the position of the register lines such as indicated at R-1 and R-2 and which lines have been given a general reference numeral R. Such coincidence is indicated in FIG. 3f by the occurrence of the scanner signals at the locations indicated by reference numerals 32 and 33 bearing the notation "In register."

By counting the impulses in the pertinent portion of FIG. 3e, it will be apparent that, in the example here illustrated, line R-1 is spaced 20 encoder impulses from position detector signal 30-1, so that the Initial Counter will register a count of 20 after the counter is cleared and reset to zero by the signal 30-1 from the cylinder position detector. Thus, in this instance, a count of 20 accumulated by the Initial Counter when the scanner signal occurs denotes that the desired register is being maintained. The number 20 used in this example has been selected on an entirely arbitrary basis for convenient illustration. It may be any number, which is predetermined during setup of the system and, more typically, will be a three or four digit number. Basically and as conveniently stated, it is predetermined by bringing the patterns of work involved into initial register and, while they remain in register, determining (by means of a visual display, for example) the count accumulated by the Initial Counter at the occurrence of the scanner signal.

After the initial setup of the system, during which the center of register, denoted by the position of line R in FIG. 3, is determined for each of the units employed on a given printing press or other machine to which the system is applied, it will thereafter provide accurate measurement, visual display, and when desired, automatic control of register between the separately applied patterns of work involved.

The conditions graphically illustrated in FIGS. 3f and 3g exemplify how any error in register is detected and its magnitude and direction determined, to provide for visual display and/or automatic correction of the error.

Assume, for the moment, that the scanner signal occurs before the Initial Counter has accumulated the predetermined count (20 in the example being used) at which the scanner signal should occur to maintain the desired register. This condition is illustrated in FIG. 3f by the position of the scanner signal 34 marked "Leading." Note that in this particular example it occurs when the Initial Counter has accumulated a count of 13, which is seven counts from the desired, predetermined count of 20. In all such instances (i.e., when there is a leading scanner signal) the scanner signal is supplied to and initiates operation of the Error Counter, as indicated in the first part of FIG. 3g at 35. This error counter then counts the encoder pulses until the Initial Count reaches 20. In this example, the error count will be seven, as represented by the seven pulses at 35 in FIG. 3g, which is temporarily stored for display. As previously mentioned, the display will also designate that the scanner signal is "Leading" (i.e., occurred before the Initial Counter reached the predetermined number), thus showing the direction of the measured register error.

Assuming now that the scanner signal occurs after the predetermined count is reached by the Initial Counter, this condition is illustrated in FIG. 3f by the position of the scanner signal 36 marked "Lagging." The scanner signal occurs, in the example being used, at the count of 27 by the Initial Counter, after the occurrence of pulse 31-2, FIG. 3e, which is seven counts after it reaches the predetermined count of 20. In such instances, the occurrence of the scanner signal does not start operation of the error counter. Instead it is started by an impulse from the Initial Counter when the latter reaches the predetermined count. It then continues to function, counting each encoder pulse 31 until occurrence of the scanner signal such as indicated at 36. The latter terminates the error count, and, again, the count is temporarily stored for display. Here again the error count will be seven as represented by the seven pulses 37 for the case illustrated at the right in FIG. 3g. When this error or the average of several successive error counts is displayed, there will also be displayed an indication of the direction of the error in register.

If the scanner signal occurs simultaneous with the accumulation of the predetermined count on the Initial Counter, the Error Counter remains inactive and accumulates no count, indicating that the desired register is being maintained.

It will be understood, that the display of either the instantaneous error or the average error count may be accomplished with display means of any suitable form, such as a meter, digital display tubes or rotary number wheels or dials, for example. Also, the direction of the measured error in register may be indicated, in case a meter is used, by the direction of deflection of its needle from a zero center or, in case electronic digital display tubes, rotary wheels or dials are used, by a similar device which displays a positive or negative sign.

It should also be understood that the terms "Initial Counter" and "Error Counter" as used herein may each designate one or more than one individual counting mechanism or section. For example, the count of a leading error in register may be accumulated on a different section of the Error Counter than the count of a lagging register error. Also, the lead and lag errors may appear, respectively, on separate display devices, each having a permanent rather than a variable index to the direction of the error displayed by that device. Also when, as may be the case, it is desired to display the average magnitude of a series of two or more consecutively measured errors, it is convenient to use a separate averaging section of the Error Counter to provide an up-count and a down-count which give the average of the individual error counts involved.

Description of the Block Diagram of FIG. 4

The block diagram of FIG. 4 represents the computer circuits needed to control registry at a given Station such as B, C, D or E in FIG. 1. Thus, FIG. 4 may correspond to the circuit for any one of the computer units 24b through 24e of FIG. 1. The scanner and position detector components in FIG. 4 have been designated by reference numerals 20 and 22 respectively, to signify that they may correspond to the scanners 20b through 20e and corresponding position detectors 22b through 22e at any one of the Stations B through E in FIG. 1. The digital encoder component which is common to the respective Stations B through E in FIG. 1 has been given the reference numeral 21 in FIG. 4 in conformity with its designation in FIG. 1. Similarly, compensator component 11 in FIG. 4 may correspond to any of the compensating rollers 11b through 11e in FIG. 1 and motor 13 in FIG. 4 may represent the associated driving motor.

To correlate FIG. 4 generally with the waveform diagrams of FIG. 3, it will be understood that the scanner component 20 of FIG. 4 supplies scanner signals such as indicated at 34 and 36 in FIG. 3f. The digital encoder component 21 supplies encoder impulses as represented by the waveform 31 of FIG. 3e, and position detector component 22 supplies position detection signals such as represented at 30-1 and 30-2 in FIG. 3d.

An adjustable counter component 40 is shown as being connected with the output of the digital encoder 21 via a conductor 41, an inverter 42 and a conductor 43, and is shown as being coupled with the position detector 22 via conductors 44 and 45. The adjustable counter 40 is arranged to define the beginning of an inspection zero which is to begin a predetermined number of encoder pulses after the occurrence of a position detector signal from position detector 22. Simply as an example, the adjustable counter 40 may be adjusted to emit a "unit zero" signal after a count of 2,900, this signal being transmitted via conductors 46, 47 and 48 to a reference generator component 50 which then begins to count encoder pulses supplied to it via line 51. In the reference generator 50, encoder pulses are counted from zero to 99, the count of 99 representing the control point and corresponding to the approximate center of the inspection zone. The inspection zone terminates after a count of 98 encoder pulses following the occurrence of the control point. The reference generator 50 transmits a control point reference signal via conductor 52 to a comparator component 54. The components 40 and 50 together constitute the "Initial Counter" which was previously referred to and this Initial Counter supplies a pulse at line 52 which may be termed the Initial Counter signal and which corresponds in time with the register signal line R of FIG. 3. For purposes of simplified explanation, FIG. 3 suggests that the Initial Counter be set directly to emit an Initial Counter signal after a count of 20; however in the present embodiment the adjustable counter 40 would be set to emit a unit zero signal at a count of 4,020, so that the reference generator 50 would then emit the reference pulse (after counting from zero to 99) at a count of 20 on the adjustable counter.

It will be observed that the scanner signal from scanner 20 is supplied via conductor 56 to the comparator 54. If the scanner signal is received at the comparator 54 in time coincidence with the Initial Counter signal from reference generator 50, no register error is detected. If the scanner signal arrives early, error counter 58 begins counting encoder pulses until the control point register signal or Initial Counter signal from reference generator 50 is reached. The count in the error counter 58 would then indicate the magnitude of a "lead" error. When the scanner signal arrives late at the comparator 54, the pulses between the control point register signal from reference generator 50 and the time of occurrence of the scanner signal are counted by the error counter 58 to measure the "lag" error. The error count is stored in the error buffer storage component 60. Lack of a scanner signal in the inspection zone causes the system to go into "fail-safe."

The comparator inputs are the control point register signal supplied via conductor 52 and the scanner pulse supplied via conductor 56. A further control input is represented via conductor 62 connected with the adjustable counter 40. The unit zero or UZ signal supplied via conductor 62 to the comparator acts to reset the comparator and put it in condition ready to accept new information from the reference generator 50 and the scanner 20. The comparator receives the control point register signal and the scanner signal, and determines if they occur at the same time or at different times. It detects which signal occurs first and presents the information on five readouts. There is a lag or lead (minus or plus) readout as indicated by lines 64 and 66 to indicate which signal arrived first. There is an error-gate output at conductor 68, and also gated reference (GR) and gated scanner (GS) outputs as indicated by conductors 70 and 72. The latter two outputs are merely the control point register signal and the scanner signal inverted.

The error counter 58 includes an error count gate whose inputs are the error gate signal supplied from the comparator via conductors 68 and 76, and an encoder pulse input via conductors 51 and 78, and an error count 98 (EC 98) input conductor designated by the reference numeral 80. The error count 98 conductor extends from fail-safe component 82 shown at the right central portion of FIG. 4.

The error counter component 58 has an additional input designated by reference numeral 86 which serves to reset the error counter in response to a unit zero signal from the adjustable counter 40 which marks the beginning of the inspection zone. The error counter has an output cable 88 which may consist of an eight conductor cable leading to the error buffer storage component 60.

The error buffer storage component 60 controls a digital to analog converter component 90 which converts the error count into a current signal with amplitude proportional to the count magnitude. The error directional amplifier 92 recognizes the order in which the control point register signal and scanner signal were received by comparator 54 and regulates the polarity of the analog error signal applied to the servoamplifier 94.

The servoamplifier 94 processes directionalized error signals, fail-safe signals via conductor 96 and feedback signals from the compensator motor tachometer 98. If the scanner signal is not received within the inspection zone, the fail-safe circuit 82 will deenergize an automatic relay and prevent unnecessary compensator action. The tachometer feedback voltage supplies motor response information. If the compensator 11 is difficult to move, the servoamplifier output will rise until the motor 13 can run at a speed corresponding to the magnitude of the error.

The motor controller 104 has a magnetic firing circuit and silicon controlled rectifiers that apply direct current to the compensator motor 13. The web-compensating roller 11 is positioned to shorten or lengthen the web so as to restore a null error condition which in turn produces a correct register for the product.

The tachometer 98 is thus driven by the compensator motor 13 as indicated by mechanical coupling line 106 to produce a feedback voltage proportional to motor speed. This indicates motor response to command signals of the servoamplifier 94.

The compensator 11 can be moved by pushbutton command when the system is under manual control. When operating under automatic control, the web compensator mechanism 11 is repositioned when register errors are detected. Limit switches are located at travel extremes to protect the motor and press.

Error transfer gate component 110 has two inputs, one is the error gate via conductor 68 and the other is the inverted encoder signals via conductor 112. The output designated ETG is represented by conductor 114. Conductor 116 branching from the ETG output line 114 connects with an input to the error buffer storage component 60. The error buffer storage component 60 functions to continuously accept error count and, when the error transfer gate signal occurs at input 116, the registered error count is read out to the converter 90 and maintained until the next transfer gate. Main transfer gate 120 receives a gated scanner signal from comparator 54 via conductor 122 and receives encoder pulses via conductor 124 from the output of inverter 42. The gate 120 serves to notify the readout delays component 126 via its output conductor 128 that the scanner signal has occurred. After occurrence of the predetermined number of such signals to readout delays component 126, this component will signal the display components 130—132 so that an error signal can be displayed.

The readout delays component 126 serves to reduce the frequency of the display output at components 130—132 without interfering in any way with the operation of the web control components associated with the error buffer storage 60. The web control system monitors and responds to errors in accordance with signals from error transfer gate 110 via conductor 116 so that this system monitors every repeat length of web and calculates the error for every repeat. Although the system is capable of operating the display at this speed, the operator would have difficulty in reading the display tubes which are indicated diagrammatically at 25b through 25e in FIG. 1 and which are part of each set of display components such as indicated at 130—132 in FIG. 4. Because of the operation of the readout delays component 126, every fourth register condition may be displayed on the readout tubes, for example. The outputs from the readout delays component 126 are a delayed main transfer gate signal "DMTG" which is supplied to conductors 134 and 135, a delayed error transfer gate signal "DETG" supplied to conductor 136 and a delayed "plus-minus" transfer gate signal "DPMTG" supplied to conductor 138.

Readout selector component 140 receives inputs from the readout delays component 126 via conductors 134 and 136, receives an input from adjustable counter 40 via a cable 142 and receives an input from error counter component 58 via cables 88 and 144. A portion of the conductors of cable 144 are connected via a cable 146 with fail-safe component 82. The readout selector has an output cable 150 for supplying control signals to the hundreds (C) and thousands (M) display tubes of component 132. The conductors of cable 150 are connected by the selector 140 either with the conductors of cable 142 or the conductors of cable 144. Output conductor 152 from the readout selector is connected by the selector either with the input line 134 or the input line 136 depending on the condition of the readout selector switch component. Output conductor 154 from readout selector 140 is connected with the anodes of the units (I) and tens (X) display tubes for activating these tubes during one condition of the readout selector. In the other condition of the readout selector, anode potential is supplied to output line 156 for energizing the anode of the plus or minus (I) display tube of component 130. The actual physical arrangement of the display tubes would be, from left to right, the plus or minus (I) display tube of component 130, the thousands (M) display tube of component 132, the hundreds (C) display tube of component 132, the tens (X) display tube of component 131 and then the units (I) display tube of component 131, in conformity with customary decimal notation.

The readout selector 140 is a two-position switch which is located at the front of the operator's panel. In the scanner signal position of the selector switch of selector 140, the hundreds and thousands count from adjustable counter 40 via cable 142 is supplied to component 132 for display, while component 131 receives anode voltage for the display tubes so as to display the units and tens count from counter 40 supplied thereto via conductor 158. At this time, output conductor 156 from selector 140 is disconnected so that the display tube of component 130 is inactive. In the error position of the readout selector 140, the error count via cable 144 is supplied to cable 150 for display by component 132, and component 130 is energized via conductor 156. It may be noted that component 130 is controlled by a "LAG" signal from comparator 54 via conductor 64 and conductor 160 which is shown as one of the inputs at the left of component 130 at the top of FIG. 4. The purpose of the two modes of operation of the display components 130—132 will become apparent from a description of the setup of the system and a summary of its operation which will be set forth after a detailed description of the individual components of FIG. 4.

Description of Exemplary Components Shown in FIGS. 5—20

FIGS. 5 and 6 together illustrate suitable circuitry for adjustable counter component 40. FIG. 5 shows a main counter 200 consisting of four decade counter stages 201—204. Each state has a first input labeled "COUNT" and a second input labeled "RESET" and four outputs labeled 1, 2, 4 and 8. By way of example, in reset condition of a counter stage, all outputs may be in a logical zero condition and supply a potential of zero volts. At the first negative transition of the encoder pulse waveform (for example during a drop from four volts to zero volts) and supplied by input line 43 to stage 201, the output line MC1 changes to the logical one condition (plus 4 volts) while the outputs MC2, MC4 and MC8 remain at the logical zero state. The next negative transition sets the MC1 output to logical zero and the MC2 output to the logical one state. The third transition sets the outputs MC1 and MC2 to the logical one state, while at the ninth transition, outputs MC1 and MC8 are at the logical one state while outputs MC2 and MC4 are at the logical zero state. The tenth transition resets all outputs to the logical zero state. When output MC8 makes the transition from logical one to logical zero, this applies a count input to line 206 leading to the "COUNT" input of the second or X counting stage 202. Similarly conductors 207 and 208 couple the outputs of the counter stages 202 and 203 with the count inputs of stages 203 and 204. A positive position detector signal at conductor 45 serves to reset each of the counter stages to the reset condition after which the count of encoder pulses begins again. It will be apparent that the MC output lines from the counter stages 201—204 can represent any count between zero and 9,999. In the illustrated embodiment, however, the position detector signal serves to reset the counter after a count of 4,999. It will be apparent to those skilled in the art that the readout from the main counter 200 is in terms of the 1-2-4-8 binary decimal code, the numbers following the output line designation MC representing the weight to be given a logical one condition of the associated output conductor. This type of decimal-counting chain is known per se and the details thereof need not be described.

FIG. 6 illustrates a unit zero generator 210 which operates in conjunction with the main counter 200 to provide a unit zero pulse at output line 46 signifying the beginning of an inspection zone. The function of the unit zero generator 210 is thus to transmit a unit zero pulse in response to the main counter 200 reaching any desired count value, for example between zero and 4,999.

Referring momentarily to the waveform diagram of FIG. 10, FIG. 10b shows position detector pulses at 212-1 and 212-2 which are supplied to input 45 of the main counter 200. FIG. 10c shows unit zero pulses at 214-1 and 214-2 as emitted from the output line 46 of the unit zero generator 210. By adjustment of the binary coded decimal switch components 221—224 of generator 210, any desired spacing may be obtained between position detector pulses such as 212-1 and the next following unit zero pulse such as 214-1. As will hereinafter be explained by adjustment of the switches 221—224 during setup, the timing of the system may be arranged such that when the web is in proper register at a given station, the scanner pulses such as indicated at 271-1 and 271-2 in FIG. 10a will occur exactly 99 encoder pulses after the unit zero pulses supplied by generator 210.

As shown in FIG. 6, the unit zero generator consists of four groups 231—234 of inverter elements such as that designated specifically by the reference numeral 235.

When a given counter stage such as counter stage 201 reaches a count corresponding to that to which the switch 221 is adjusted, a logical one output signal will appear on the associated output line such as 241. When each of the output lines 241—244 is simultaneously in a logical one condition, NAND gate 246 will switch its output to a logical zero condition. The logical zero condition at the output line 46 will last for exactly the time interval between successive encoder pulses, and when the next succeeding encoder pulse arrives at the input line 43, the output line 46 will return to the logical one condition.

FIG. 7 illustrates the detailed structure of the binary coded decimal switches 221—224, and for the sake of correlation with FIG. 6, switch 221 has been specifically illustrated in FIG. 7. To further assist in correlating FIGS. 6 and 7, the input lines to switch 221 have been specifically designated by reference numerals 251 through 258. FIG. 7 further diagrammatically indicates a manual selector knob 260 having a stationary index marker 261 and having mechanical coupling as indicated at 262 with a series of switch contacts generally designated by the reference numeral 264. FIG. 7 illustrates the configuration of the contacts 264 when switch 221 is adjusted to select a count of two from counter stage 201. It will be observed that in this condition the contact 264 associated with conductor 253 is closed while the contacts associated with conductors 251, 255 and 257 are open. It will further be observed that the contact associated with input line 252 has the opposite condition from the contact associated with input line 251, and that the same is true of the successive pairs 253, 254; 255, 256; and 257, 258. In operation, it will be observed that when the counter stage 201 registers a count of one, output line MC1 will be in a logical one condition to apply a relatively positive potential to input line 251. On the other hand, inverter 235 will supply a ground potential at line 252 which will be transmitted to the output line 241 of the switch 221. Thus, regardless of the condition of output lines MC2, MC4 and MC8, the output from switch 221 will be ground potential representing a logical zero. If now a count of two is registered in stage 201, the output line MC2 will be in a logical one state, causing a ground potential to be applied to input line 254. It will be observed, however, from FIG. 7, that with selector 260 selecting the decimal value of two, the switch contact associated with line 254 will be opened preventing the application of a ground potential to output line 241. Similarly, ground potential will be applied to input conductors 251, 255 and 257, but the associated contacts 264 will be open. Accordingly, when stage 201 reaches a count of two, the output line 241 will assume the logical one, positive voltage condition. It will be understood by those skilled in the art that the binary coded decimal switch 221 will place the contacts 264 in a condition to represent by closed contacts the desired number in 1-2-4-8 binary decimal code. For example, if the selector knob 260 is rotated through 180° to select the decimal number 7, the contacts 264 associated with input lines 251, 253 and 255 would be closed while the contact associated with input line 257 would be open. As will be understood by those skilled in the art, the contacts associated with input lines 252, 254, 256 and 258 will represent the complement of the selected number. The switches 222—224 will be identical to the switch 260 and will be set to select the digit values for the tens, hundreds and thousands place of the count to be selected.

FIG. 8 illustrates a detailed circuit for reference generator 50 having an input line 51 from digital encoder 21, FIG. 4 and having an input line 48 from the unit zero output 46 of unit zero generator 210, FIG. 6. Referring momentarily to FIG. 10, the function of the reference generator 50 is to count encoder pulses after being reset to zero by the unit zero pulse such as indicated at 214-1, FIG. 10, and to generate an initial counter signal as represented in FIG. 10e at 270-1 and 270-2 a predetermined number of counts after the occurrence of the unit zero pulse immediately preceding. By way of example, the reference generator may transmit the Initial Counter signal at a count of 99 encoder pulses after it is set to zero by means of a unit zero pulse. FIG. 10a illustrates scanner pulses at 271-1 and 272-1, and the system is so arranged that these scanner pulses will be time coincident with the Initial Counter pulses such as 270-1 and 270-2 when the web is exactly in register at a given station. It may be noted at this time that FIG. 10d illustrates the concept of an inspection zone which may for example begin in response to a unit zero pulse and extend for a count of 98, for example, beyond the occurrence of the Initial Counter pulse which occurs centrally of the inspection zone. Functionally, if a scanner pulse is outside the inspection zone as represented by pulse 271-2 in FIG. 10a, the result will be a fail-safe condition which will be referred to in greater detail hereinafter. For the sake of clarity, it should be stated at this point that the Initial Counter signals shown in FIG. 10e and which are supplied at output 52 of reference generator 50, FIG. 8, are also referred to herein as the control point register signal or the reference signal. The register lines R of FIG. 3 should be conceived of as being time coincident with and defined by the output pulses from reference generator 50 of FIG. 8. The occurrence of the Initial Counter signals of FIG. 10e is precisely locked to the count of encoder pulses, and thus is locked to the rotation of the cylinders 5a, 5b, 5c, 5d and 16. On the other hand, the scanner pulses shown in FIG. 10a are precisely synchronized with the position of the web 1 as it approaches the scanner of a given station.

Referring now to the details of the illustrated reference generator, the circuit of FIG. 8 includes two D-type, edge-triggered flip-flops 281 and 282, a dual input NAND gate 283, a four input NAND gate 284 and two decade counters 285 and 286.

The flip-flops 281 and 282 have four inputs, "PRESET" and "CLEAR" inputs being shown for flip-flop 281, and "D" and "CLOCK" inputs being shown for flip-flop 282. The two outputs are labeled Q and $\overline{Q}$ (the latter symbol representing the complement of Q). In the D-type flip-flop, considering first only the D and the CLOCK inputs, if the D input is in the logical zero state, then the next positive transition that occurs at the CLOCK input will set the Q output to the same state as the D input (in this case logical zero). The $\overline{Q}$ output assumes the opposite state (in this case logical one). If the D input is in the logical one state, the next positive transition at the CLOCK input will cause the output Q to go to the logical one state, and the output $\overline{Q}$ to go to the logical zero. A CLEAR or PRESET input will dominate the CLOCK or D inputs. A logical input to the CLEAR input sets Q to logical zero, and a logical zero signal to the PRESET input sets the output Q to logical one. If the CLEAR and PRESET inputs are in the one state as is the case for flip-flop 282, then the D and CLOCK inputs can govern the output states of Q and $\overline{Q}$. This type of flip-flop is known per se and need not be further described.

The NAND gates 283 and 284 have the same operation as described for the NAND gate 246 of FIG. 6 and this type of gate is, of course, known per se. The decade counter stages 285 and 286 have the same operation as described for stages 201—204 FIG. 5. It will be apparent that the various elementary components have been represented by the same drawing symbols throughout the several views.

In operation of the circuit of FIG. 8, when a unit zero signal is received at input 48, the Q output goes to a logical one state. The unit zero signal is a negative going pulse when it occurs. The next encoder positive transition at input line 51 will cause the output of NAND gate 283 to go to the zero state. The result is the introduction of a count of one into the counterchain comprising decade stages 285 and 286. The Q output of flip-flop 281 remains in the logical one condition, enabling the NAND gate 283 so that encoder pulses are transmitted to the count input of stage 285. The counter stages 285 and 286 will count to 99 at which time output lines 291—294, representing weighted values of 1, 8, 10, and 80, respectively, will be in a logical one condition. Accordingly, the output of NAND gate 284 will go to a logical zero to place the Q output of flip-flop 282 in the logical zero state. The transition at the Q output line 52 is the reference signal such as indicated 270-1 in FIG. 10 (except that polarity is reversed). The output at line 52 is also coupled via line 296 to the "CLEAR" input of flip-flop 281 causing the Q output of this flip-flop to return to logical zero. The NAND gate 283 is thus disabled so that no further encoder pulses are admitted to the counter stage 285. Thus, the counter chain comprising stages 285 and 286 stops counting at the count of 99. The $\overline{Q}$ output of flip-flop 282 causes output line 298 to go to a logical one condition so as to reset the counter stages 285 and 286 to zero.

In summary, the reference generator 50 is started by the unit zero pulse such as indicated at 214-1 in FIG. 10 signifying the beginning of the inspection interval such as indicated at 272-1 in FIG. 10. The reference generator counts encoder pulses up to the count of 99 and then generates a reference pulse such as indicated at 270-1, FIG. 10, signifying the control point of the inspection zone. The reference generator then resets itself to zero to await the next unit zero signal such as indicated at 214-2 in FIG. 10.

FIG. 9 shows the comparator circuit which serves to determine the order of occurrence of the reference signal from the reference generator 50, FIG. 8, and the scanner signal from scanner component 20, FIG. 4. The comparator consists of three D-type, edge-triggered flip-flops 301—303 and three dual input NAND gates 305—307. The unit zero signal at input conductor 62 is the preset input for flip-flops 301 and 302. The unit zero signal at conductor 62 is a negative going signal and a logical zero input will set the Q output lines 311 and 312 to a logical one condition and the $\overline{Q}$ output lines 313 and 314 to a logical zero condition. If the scan pulse arrives first at input line 56, the $\overline{Q}$ output line 314 goes to a logical one condition, and NAND gate 305 will supply a logical zero output at line 316. When line 316 goes to a logical zero condition, the output line 68 of NAND gate 307 will go to a logical one condition to provide the error gate signal from comparator 54. Also when line 316 at the output of NAND gate 305 goes to logical zero condition, the resultant negative going pulse at the preset input of flip-flop 303 will set the Q output line 64 to a logical one and the $\overline{Q}$ output line 66 to a logical zero.

When the reference signal now arrives at input line 52, the Q output line 311 from flip-flop 301 will go to a logical zero state returning output line 316 to a logical one condition and returning output line 68 to the logical zero condition. The duration of the logical one condition of the output line 68 is thus proportional to the error in registration. The outputs of the flip-flop 303 will remain in their previous condition since the preset input of flip-flop 303 does not respond to a positive condition of line 316. The negative transition at the "-CLEAR" input of the flip-flop 301 receiving the reference signal set the $\overline{Q}$ output line 313 to logical one so that the gated reference output line 70 assumes the logical one condition. Similarly, when the scanner signal arrived at input line 56 of flip-flop 302, the $\overline{Q}$ output line 314 went to logical one placing the gated scanner output line 72 in a logical one condition.

It will be apparent to those skilled in the art from the foregoing description that if the scanner signal arrives after the reference signal, the output of the NAND gate 306 goes to the logical zero condition, again placing error gate output line 68 in a logical one condition, this time until the scanner signal is received. When output line 318 from NAND gate 306 goes to the logical zero condition, flip-flop 303 will be placed in such a condition that the Q output line 64 registers a logical zero, while the $\overline{Q}$ output line 66 registers a logical one condition signifying that the reference pulse led the scanner pulse.

It will also be apparent to those skilled in the art that if the reference and scanner signals arrive simultaneously, the error gate output line 68 will remain in the logical zero condition signifying a zero error in registration. The condition of the flip-flop 303 will remain unchanged under these circumstances. The error display components 130 and 132 may acceptably register a plus or minus zero error under these conditions, rather than blanking the polarity display tube associated with component 130.

FIG. 11 shows a circuit diagram for the error transfer gate component 110 which receives the error gate signal via conductor 68 from the comparator circuit of FIG. 9. The function of the error transfer gate circuit 110 is to signal at the output line 114 when an error count is complete.

The error transfer gate consists of a D-type flip-flop 321, a dual input NAND gate 322 and an inverter 323. The inverted encoder pulses at conductor 112 form the "CLOCK" input to the flip-flop 321. The D input of the flip-flop is held at ground potential (logical zero). Therefore, with a positive transition at the "CLOCK" input, the Q output line 326 will go to logical zero and remain there pending a negative going signal at "-PRESET" input line 328. The Q output line 326 thus serves to maintain output line 114 in a logical one condition. The error gate signal of input line 68 is positive going to provide a negative going output at line 325 of inverter 323 so as to actuate the "PRESET" input of flip-flop 321 via line 328. This sets the Q output line 326 to logical one condition, where it will remain as long as the "PRESET" input is in the zero state. When the comparator 54, FIG. 9, removes the error gate signal, output line 328 from the inverter 323 will return to the logical one condition releasing the "PRESET" input of the flip-flop. The Q output line 326, however, will remain in the logical one condition sufficiently long so that the NAND gate 322 goes to logical zero, generating the error transfer gate pulse ETG which is utilized to signal the end of an error count operation. With the arrival of the next positive transition of the inverted encoder signal at the "CLOCK" input of flip-flop 321, the Q output returns to logical zero, and the output of the NAND gate 322 then returns to logical one. Thus, the error transfer gate pulse lasts for a very short time and is a negative going pulse from the logical one state to the logical zero state. The circuit is now in its original condition ready to receive a further error gate signal.

FIG. 12 illustrates an error count NAND gate 330 which together with the counting circuitry of FIG. 13 forms the error counter component 58, FIG. 4. The inputs to the gate 330 are inverted encoder pulses supplied by conductor 78, an error count 98 signal supplied by conductor 80, and an error gate signal supplied by conductor 76 from the error gate output line 68 of the comparator 54, FIG. 9. If an error exists, the error gate line 76 will assume a logical one condition for the duration of the error interval, enabling the error counter to count encoder pulses to provide a quantitative measure of the error. The error count 98 conductor 80 from fail-safe circuit 82, FIG. 4, is normally in the logical one state. If the error counter reaches a counter of 98, however, the error count 98 input conductor 80 will assume a logical zero condition, and the count of encoder pulses by the error counter will be interrupted. Normally, however, the error gate input line 76 will return to the logical zero condition before a count of 98 has been reached. The output line 331 from NAND gate 330 thus receives a series of encoder pulses, the number of which is directly proportional to the degree of the error in registration.

FIG. 13 shows the error counter circuitry for counting encoder pulses transmitted by the error counter gate 330, FIG. 12. The error counter circuit 340 is composed of two tandemly connected decade counter stages 341 and 342, interconnected by means of a conductor 343, and an inverter 344 for receiving unit zero pulses via conductor 86 from adjustable counter component 40, FIG. 4. The inverter 344 inverts the unit zero signal from a negative going signal at conductor 86 to positive going signal for conductors 346 and 347 leading to the reset input of counter stages 341 and 342. The error counter circuit is capable of delivering at its output lines EC1, EC2, EC4, EC8, EC10, EC20, EC40 and EC80 any decimal number from zero to 99. These output conductors form the conductors of cable 88, FIG. 4.

FIG. 14 shows the error buffer storage component 60, FIG. 4, which is connected with the error counter 58, FIG. 4, by means of cable 88 containing conductors EC1, EC2, EC4, EC8, EC10, EC20, EC40 and EC80.

The buffer storage circuit 60 comprises two buffer storage elements 351 and 352 having respective gate input lines 353 and 354 connected with the error transfer gate conductor 116. The error transfer conductor 116 connects with the output conductor 114 of the error transfer gate 110, FIG. 11.

Each buffer storage element receives a 1-2-4-8 input from an associated decade counter stage of FIG. 13. The output lines from the buffer storage element 351 and 352 have been designated by the reference numerals 360–1 through 360–8 in FIG. 14, and a corresponding reference numeral 360 has been applied in FIG. 4 to designate generally the group of eight output lines leading to the digital to analog converter component 90, FIG. 4.

The buffer storage elements 351 and 352 are so constructed that the digital output therefrom at conductors 360 does not change until the gate conductors 353 and 354 go to a logical zero state in response to an error transfer gate signal at conductor 116. At this time the output from the buffer storage element will assume the same state as the corresponding input from the counter stages 341 and 342, FIG. 13. If the gate conductors 353 and 354 remain in the zero state, the output will follow the input exactly. When the gate goes to the one state again, the output will remain in the state existing at the time the gate went positive. With a continuous count applied to the input of the buffer storage elements 351 and 352, a negative transition at the gate conductors 353 and 354 causes the output to assume a condition corresponding to the count which was on the input when the gate conductors went negative. If the gate conductors 353 and 354 go positive before the next change in count at the stages 341 and 342, the output will continue to readout the input at that instant. This way the unit can store information and release it upon command. As indicated by the notation within the rectangles representing the buffer storage elements 351 and 352, the output of the buffer storage elements are inverted relative to the input so that if input conductors EC1 and EC4 were in a logical one state representing a "5" input, output conductors 360-1 and 360-3 would be in a zero state representing the complement of the input number.

Thus the error buffer storage component 60 functions to continuously accept error count at it input and, when the error transfer gate signal occurs at conductor 116, the input count appears at the output (in complement form) and is maintained until the next error transfer gate signal is received.

While the details of the digital-to-analog converter do not per se form a part of this invention, a transistor-resistor-diode circuit may be utilized wherein a logical zero input to a given stage serves to turn off the associated transistor, allowing a predetermined amount of current to pass through an associated diode to the output line such as indicated at 361 in FIG. 4. If the input represents an error one, this would allow one increment of current to pass through the diode into the output. An error of two would double the current etc. The converter thus delivers an analog current amplitude that corresponds to the digital error count.

The error directional amplifier component 92 likewise per se forms no part of the present invention. The error directional amplifier component, FIG. 4, may comprise in effect two separate amplifier stages which are turned on selectively by the application of a logical zero to conductors 64 and 66 by the comparator circuit of FIG. 9. When the "LEAD" conductor 66 is at logical zero, the error analogue output signal appears at conductor 371, FIG. 4, while if the "LAG" conductor 64 is at logical zero, the amplified error signal will appear at output conductor 372, FIG. 4.

FIG. 15 shows the fail-safe circuit 82, one function of which is to respond to an error count of 98 as registered at input conductors 146-1, 146-2 and 146-3 of cable 146, FIG. 4, to supply a disabling potential to conductor 80 leading to the error count gate 330, FIG. 12. A second function of the circuit is to provide a fail-safe signal to conductors 96-1 and 96-2 of the line 96 leading from fail safe component 82 to servoamplifier 94, FIG. 4, for disabling the servoamplifier in the event of an excess error count.

The fail-safe circuit has two D-type flip-flops 381 and 382 two 3-input NAND gates 383 and 384, and a transistor-driving circuit 385 for fail-safe relay-energizing coil 386. The gated reference and gated scanner signals at conductors 70 and 72 are positive signals while the unit zero signal at conductor 47 is a negative signal. When conductor 47 assumes a logical zero condition, flip-flop 381 is preset and its Q output conductor 388 goes to logical one. With the arrival of the scanner signal, the gated scanner signal will cause conductor 70 to go to the one state, and with the arrival of the gated reference signal, the conductor 72 will go to the one state. This will cause the output 390 of gate 383 to go to the zero state causing the Q output line 391 of flip-flop 382 to go to logical one. The transistor 382 is now turned on and the fail-safe relay coil 386 energized to close contact 395 and allow the servoamplifier 94 to function in the automatic mode.

If the scanner signal failed to arrive, for example, the error count would reach its maximum of 98 (representing the maximum extent of the inspection zone 272-2 in FIG. 10) causing output line 80 to go to the zero state. This zero condition of line 80 would activate the "CLEAR" input lines 397 and 398 of flip-flops 381 and 382 setting the flip-flop Q output lines 388 and 391 to logical zero. When line 391 is set to logical zero, it turns off the fail-safe relay driving transistor 392 and the fail-safe relay coil 386 is deenergized. This prevents the servoamplifier 94 from operating in the automatic mode. At the next cycle, if there is still no scanner signal, the Q output line 391 will remain in the logical zero condition, maintaining the fail safe condition until such time as the gated scanner signal occurs within 98 counts of the gated reference signal.

FIG. 16 shows readout selector component 140 which comprises a multiple contact two-position switch having a manual operating knob 400. In the position shown, the respective conductors of cable 142 from adjustable counter 40, FIG. 4, are connected with the respective conductors of cable 150 which leads to display component 132, FIG. 4. Further, conductor 134 is connected with conductor 152 and anode potential is supplied to conductor 154 leading to display component 131, FIG. 4. The illustrated position of the switch contacts generally indicated at 401 may be termed the "setup" or "scanner signal" position in which the switch selects the hundreds and thousands count from main counter 200, FIG. 5, so that four decimal digits may be displayed by the display tubes of components 131 and 132. In the "error" position of the readout selector switch, the error count from error counter component 58 is periodically transmitted to the buffer storage elements of component 132 for display along with an indication of the polarity of the error by means of the display tube of component 130. The anode supply is always connected to the hundreds and thousands display tubes of component 132.

FIG. 17 illustrates the main transfer gate component which functions to supply a main transfer gate signal at output conductor 128 which notifies the readout delays component 126 that the scanner signal has arrived so that it may initate the display of any error count.

The main transfer gate circuit is composed of a D-type flip-flop 411 and a dual input NAND gate 412. The D input of the flip-flop is held at logical zero and the "CLOCK" input receives encoder pulses via conductor 124. When there is a positive transition at the "CLOCK" input 124, it will set the Q output line 414 to logical zero. The "PRESET" input line 415 is connected with the gated scanner line 122 which connects with conductor 72 of the comparator circuit 54, FIG. 9. The gated scanner line 122 is normally at logical zero and will go to logical one when a scanner signal arrives. This will preset the Q output line 414 to logical one, regardless of the D and "CLOCK" inputs. At the arrival of a scanner signal, the gated scanner line 122 will go to a logical one condition, and the output 128 of the NAND gate 412 will go to logical zero. The gated scanner signal removes the logical zero condition from "PRESET" input line 415 so that the next encoder pulse at line 124 will set the Q output line 414 to logical zero, and the output line 128 will go to logical one again.

FIG. 18 shows circuitry for the readout delay component 126 whose function is to reduce the frequency of the display output from components 130—132 without interferring with the readout operation of the web control components. The readout delay circuit utilizes two JK flip-flops 421 and 422, three input NAND gates 424—426 and four inverters 431—434. Both the J and the K input of flip-flops 421 and 422 are held at the logical one state which causes the Q output lines 436 and 438 to alternate between the logical zero and the logical one states in response to successive negative transitions at the respective input lines 44 and 440. The first negative transition that occurs at the "CLOCK" input of flip-flop of 421 may set output line 436 to the one state, for example. The next negative transition at the "CLOCK" input line 44 will set the Q output line 436 to the zero state to provide an actuating input at conductor 440 of the second flip-flop 422. If, for example, the flip-flop 422 had been in the zero state, the output line 438 would go to the one state. The first flip-flop Q output line 436 together with the second Q output line 438 would then cause the output of gate 424 to go to a logical zero state producing a logical one condition at conductor 442. The main transfer gate signal from conductor 128, FIG. 17, is inverted by inverter 431 to provide a logical one condition at conductor 443, and thus to provide a logical zero condition at conductor 134. The logical one condition at conductor 442 is transmitted by conductor 444 to one input of NAND gate 426 which is then enabled so as to transmit an error transfer gate signal received from conductor 114 of error transfer gate 110, FIG. 11. The delayed transfer gate signal DETG is supplied via conductor 136 to readout selector 140, FIG. 16, while the inverted signal supplied to conductor 138 is transmitted to display component 130. One of every four position detector signals supplied to input line 44 by position detector component 22 is able to pass through the flip-flop chain including stages 421 and 422 so as to permit an error gate transfer pulse to progress to the display components 130—132.

FIG. 19 shows certain details of the display components 130—132 which selectively serve to display a count registered in the main counter 200, FIG. 5, and in the error counter 340, FIG. 13. Thus FIG. 19 shows four buffer storage units 451—454 having respective gate input lines 461—464 and respective count input lines. The count input lines MC1, MC2, MC4, MC8, MC10, MC20, MC40 and MC80 represent respective conductors of cable 158, FIG. 4, and for the sake of clarity only the general reference numeral 158 has been applied to this group of eight conductors in FIGS. 5 and 19. It will be understood that these same conductors are also connected with respective input lines having their corresponding labeling in FIG. 6. The conductors of cable 150, however, interconnecting the readout selector of FIG. 16 and the input lines for buffer components 453 and 454, FIG. 19, have been given individual reference numerals 150-1 through 150-8. The buffers 451—454 operate in the same manner described with reference to the buffers 351 and 352 in FIG. 14. Component 468 in FIG. 19 is a D-type flip-flop having its D input connected with output line 64 of comparator 54, FIG. 9, via line 160 and having its "CLOCK" input line connected with DPMTG output line 138 of readout delay circuit 126, FIG. 18.

When selector switch 140, fig. 16, is in the "setup" condition shown, the readout display tubes of display component 131 will receive anode voltage from an anode supply conductor 471, FIG. 16, which connects with a conductor 154 leading to component 131. In this mode of operation, when the binary counting chain 421, 422, FIG. 18 has reached a count of 3, the next scanner signal will produce a delayed main transfer gate signal at conductor 134, FIG. 18, which conductor connects with conductor 135 as shown in FIG. 4. Conductor 135 in turn connects with gate conductors 461 and 462 of buffer elements 451 and 452, FIG. 19 thus transferring the units and tens count instantaneously in the main counter 200, FIG. 5, to the buffer elements 451 and 452. Simultaneously the delayed main transfer gate signal at conductor 134, FIG. 18, is connected by means of switch 140, FIG. 16, with conductor 152 which leads to the input gates 463 and 464 of buffer elements 453 and 454. Thus, the hundreds and thousands stages 203 and 204 of the main counter 200 are simultaneously inserted into the buffer elements 453 and 454, so that the buffer elements 451—454 register a four-place binary coded decimal number representing the instantaneous count in the main counter 200, FIG. 5, at the time of occurrence of a scanner pulse. This reading of the main counter during setup enables an approximate setting of the adjustable counter of FIGS. 5—7 so that the reference pulses emitted at line 52, FIG. 8, will approximate the correct set point for accurate registration. The complementary output from buffer elements 451—454 is indicated as being supplied to respective readout display components 481—484 which may comprise conventional components for converting the complementary binary coded decimal input to corresponding displayed decimal digits. Thus the elements 483—484 may include four decimal decoder/drivers and four digital readout tubes, each having 10 cathodes (providing digits 0 through 9) and one anode. The decoder driver serves to ground the correct one of each of the set of 10 cathodes of the respective display tubes. The tubes are neon-filled and when any of the cathode plates are grounded, or put to the logical zero, with respect to the anode they will glow.

Flip-flop 468 is shown driving a readout display element 485 which may include a transistor circuit with two separate stages, a minus stage driven by Q output line 487 and a $\bar{Q}$ output line 488 driving a plus transistor stage. The lag signal at conductor 160 when in the logical zero state indicates a lag error, and when in the one state indicates a lead error. Thus, if there is a lag error, the delayed plus minus transfer gate signal at conductor 138 will cause the Q output line 487 to assume the logical zero state, while output 488 assumes the logical one state. The minus amplifier stage of component 485 is thus activated so as to supply ground potential to the minus cathode of the associated readout display tube, so that this tube will display a minus symbol when anode potential is supplied to the anode line 156, FIG. 16, for this display tube.

FIG. 20 is a diagrammatic illustration of the operators control cabinet 500 corresponding to one of the sections 24b through 24e indicated in FIG. 1. The five readout tubes are visible through a dark glass window indicated at 501 when the respective anodes are energized. The tubes are arranged from left to right along window 501 as follows: a plus-minus tube indicates lead (+) and lag (−) errors in register; four numerical readouts show digit counts in thousands (M), hundreds (C), tens (X) and units (I). In the "setup" position of selector knob 400, FIG. 16, the display indicates the total number of encoder pulses received at the main counter 200, FIG. 5, when the scanner signal arrives. In the "error" position of control knob 400 (which is also indicated in FIG. 20) register deviations from the control point or set point are shown with plus or minus symbols to indicate the direction of misregister.

FIG. 20 also shows four manual dials 260-I, 260-X, 260-C and 260-M corresponding to knob 260, FIG. 7, which provides for a manual setting of the set point for a press run. The readout tubes display the count total (between 1 and 5000) when a scanner signal is received by the computer. That number, less 100, is set on the four dials 260 so as to determine the count at which a unit zero pulse such as indicated at 214-1, FIG. 10, is generated. This is the count that initiates an inspection zone such as indicated at 272-1, FIG. 10, at each revolution of the position detector 22 which is coordinated with each resetting of the adjustable counter 40, FIG. 4. From the count set on the dials 260, the control point is 99 counts later, and the inspection zone closes 99 counts beyond the control point. A large knob is indicated at 502 which is normally in a vertical position. When the knob is turned clockwise while in manual mode, it will apply power to the compensator motor 13 making it run in a direction that will tend to advance the printed matter on the web toward the scanner 20. When it is turned counterclockwise, the printed matter will tend to be retarded or moved upstream relative to the scanner.

The reference numeral 504 indicates a function switch. With the pointer of the function switch 504 in the vertical position, the register control will be under manual control and the compensator knob 502 will be able to operate the compensator motor 13.

With the knob 504 in the left hand position, the control point can be established as follows. The press is adjusted to substantial register condition and then it is stopped so that a register mark is positioned in the light beam of the scanner 20. A mark simulator pushbutton is then closed, causing activation of gate input lines 461—464, FIG. 19, to register the number in the main counter 200, FIG. 5. The register adjust switches 260 are then set to a count 100 less then that displayed at the window 501, This is a coarse setting for the control point and usually will require some fine adjustment later.

When the function 504 is set to the righ-hand position, the system will automatically apply corrective actions whenever errors are detected.

The display control 400 has previously been described in connection with FIG. 16. In "setup" position, the digital readout tubes will indicate the count total at the time the scanner or mark simulator signal arrives. In the "error" position the two right-hand readout tubes (associated with elements 483 and 484, FIG. 19) and the plus-minus readout tube (associated with element 485, FIG. 19) are utilized. They show the direction of an error and its magnitude in digital counts. In automatic operation the display knob 400 is usually left at the "error" position.

The other control knobs relate to features which are not per se part of the present invention.

SUMMARY OF OPERATION

In setting up the illustrated system, the web is first manually placed in substantial register with the work-applying member such as member 16. Then, with the selector knob 400, FIG. 16, in the "setup" position shown, the web may be advanced until the scanner signal or a simulated scanner signal activates the buffer gates 461—464, FIG. 19, to read the condition of the respective main counter stages 201—204, FIG. 5. The reading on the display tubes of display elements 481—484, FIG. 19, then represents the number of encoder pulses between the occurrence of a position detector signal such as indicated at 212-1 in FIG. 10 and the occurrence of a scanner pulse such as indicated at 271-1 in FIG. 10. The count at which unit zero pulse 214-1, FIG. 10, is desired may then be substantially estimated, and this estimated count may be set into the unit zero generator 210, FIG. 6, by means of knobs such as indicated at 260 in FIG. 7, the knobs for the individual switch components 221—224 being indicated in FIG. 20.

If now the switch 400, of FIG. 16, is placed in the "error" position and operation resumed with the web in exact register, any error appearing in the readout tubes of display components 483—485, FIG. 19, can be observed and provide the basis for the fine adjustment of the unit zero switches 221—224, FIG. 6. By this approach, an accurate digital set point for a given operation may readily be established.

Having established the set point for each of the successive stations B through E of FIG. 1, the system can then be placed under automatic operation, each error count from error counter 58, FIG. 4, being supplied to the error buffer storage 60 for conversion to an analog control signal. Also, the position detector signal supplied to conductor 44, FIG. 4, may be utilized to sample the error count of component 58 at any desired submultiple of the position detector frequency.

In the event of a failure of the scanner component 20 to generate a scanner signal, or in the event of an error count greater than 98, fail-safe component 82 is notified so as to disable the counting of encoder pulses via conductor 80 which leads to the error counter 58. The fail-safe component may also switch the servo amplifier 94 out of the automatic mode by means of connection 96, FIG. 4, until scanner signals are again being received within the required inspection zone such as indicated at 272-1 in FIG. 10.

It will be apparent that many modifications and variations may be effected without departing from the scope of the novel concepts of the present invention.

We claim as our invention:

1. Apparatus for detecting and measuring errors in register between repetitive patterns of work, including spaced register indicia, on a moving web of material and other repetitive patterns of work subsequently applied to the web by a rotary member located along the path of web travel and operated at a peripheral speed substantially corresponding to the linear speed of the web, said apparatus comprising:
    a. a web scanner constructed and arranged to detect the occurrence of said indicia on the web adjacent to the locus of said rotary member and to provide an abrupt, electrical scanner signal upon each such occurrence,
    b. a position detector driven in synchronism with said rotary member and constructed and arranged to provide an abrupt, electrical detector signal when a point on the periphery of said rotary member reaches a specific angular position,
    c. a rotary, digital encoder driven in synchronism with said rotary member and constructed and arranged to provide a series of encoder pulses, each of which represents a uniform, small angle of rotation of said rotary member,
    d. an initial pulse counter connected to receive said detector signals and said encoder pulses, count said encoder pulses starting upon the occurrence of each detector signal and provide an initial counter signal when its count reaches a predetermined value,
    e. error-counting means connected with said encoder, said initial counter and said scanner to receive the encoder pulses, the initial counter signal and the scanner signal respectively therefrom, to count said encoder pulses starting upon occurrence of the scanner signal and ending upon occurrence of the initial counter signal when the scanner signal is first to occur, and to count said encoder pulse starting upon occurrence of the initial counter signal and ending upon occurrence of the scanner signal when the initial counter signal is first to occur, to provide an error count, and
    f. output means connected with said error-counting means for generating an error signal having characteristics in accordance with the magnitude of the error count and in accordance with the order of occurrence of the scanner signal and the initial counter signal.

2. The apparatus of claim 1 with said output means comprising display means cOnnected to said error-counting means for receiving and displaying selected ones of the error counts generated by said error-counting means.

3. The apparatus of claim 2 wherein said display means comprises a plurality of electronic digital display tubes and a similar tube which displays a sign indicative of the order of occurrence of the scanner signal and the initial counter signal.

4. The apparatus of claim 1 with said output means being connected with said error counting means and being operative to sample each successive error count therein and to generate an output error signal of magnitude in accordance with the magnitude of the error count and of polarity in accordance with the order of occurrence of the scanner signal and the initial counter signal.

5. Apparatus according to claim 4 with said output means further comprising error display means connected with said error-counting means and with said position detector and providing for the display of the error count at a sampling rate equal to submultiple of the rate of occurrence of said position detector signals.

6. The method of determining the direction and magnitude of errors in register between repetitive patterns of work, represented by recurrent register indicia, on a moving web of material and separate, repetitive work subsequently applied to the web by a rotary member, said method comprising the steps of:
    a. scanning the web at a point along the path of web travel adjacent to the locus of said rotary member and generating an abrupt, electrical scanner signal in response to each of said recurrent register indicia,
    b. generating an abrupt electrical position signal upon each revolution of said rotary member when a point on its periphery reaches a specific angular position,
    c. generating during each revolution of said rotary member a train of encoder pulses in such manner that each pulse represents a substantially uniform small angle of rotation of said rotary member and a substantially uniform short distance of travel of the web,
    d. counting the number of encoder pulses generated during each revolution of said rotary member starting with the occurrence of said position signal and deriving a reference signal when the count of encoder pulses reaches a predetermined value,
    e. separately counting the number of encoder pulses generated between the occurrence of the scanner signal and the reference signal, regardless of which is first to occur, and starting the separate counting in response to the first to occur of said scanner signal and said reference signal, and reading the accumulated count of said encoder pulses in response to the last to occur of said scanner signal and said reference signal, and f. deriving from said separately counted pulses and from the first to occur of said scanner signal and said reference signal, register error signals having characteristics indicative of the number of such separately counted pulses and the order of occurrence of said scanner signal and said reference signal.

7. The method of claim 6 including the deriving of register error signals of the analog type, having a magnitude directly proportional to the separately counted pulses and a polarity dependent upon the order of occurrence of said scanner signal and said reference signal.

8. The method of claim 7 further comprising displaying a number in accordance with the number of separately counted encoder pulses at a readout rate equal to a submultiple of the rate of occurrence of said position signals.

9. The method of claim 6 further comprising visually displaying the count of said encoder pulses as a plurality of decimal digits, and changing the visual display at a rate which is less than the rate of the successive counting cycles.

10. A registration error measuring system for measuring the distance of any misregistration between a moving work receiving means and work applied thereto by a work applying means substantially coordinated in its operation with the movement of such work-receiving means, comprising:
   a. scanning means cooperable with said work-receiving means for scanning the same to produce successive scanner signals which are precisely correlated with the instantaneous position of said work-receiving means,
   b. encoder means substantially synchronized with the operation of said work-applying means for generating encoder pulses having a repetition rate substantially proportionally related to the rate of operation of said work-applying means,
   c. adjustable counting means for counting and responding to an adjustable number of said encoder pulses and for cyclically resetting in response to the operation of said work-applying means for providing a series of reference pulses substantially precisely coordinated with the operation of said work-applying means relative to said work-receiving means and which are to be time coincident with the respective scanner signals when the work-applying means is in registration with said work-receiving means,
   d. error-counting means for receiving both said reference pulses and said scanner signals, and for counting the number of encoder pulses which occur in any interval between the occurrence of a respective one of said reference pulses and a corresponding one of said scanner signals, to provide error counts in successive cycles of said adjustable counting means, and
   e. incrementally calibrated display means coupled to said error-counting means for displaying an incrementally calibrated error readout in accordance with error counts supplied thereto from said error-counting means.

11. A system according to claim 10 in which said adjustable counting means comprises a main counting circuit having plural decimal counting stages, and said incrementally calibrated display means includes digital display devices coupled to respective stages of said main counting circuit for displaying the number of encoder pulses occurring between a resetting of said adjustable counting means and the occurrence of one of said scanner signals to assist in the adjustment of said adjustable counting means during setup of the system.

12. A system in accordance with claim 10 wherein said adjustable counting means comprises manually operable digital switching means for selectively establishing any one of a series of successive counts at which said reference pulse is generated.

13. A system according to claim 10 with said incrementally calibrated display means comprising a series of digital number display devices, and readout means coordinated with the cyclical resetting of said adjustable counting means and operable at a sampling rate equal to a submultiple of the cyclical resetting of the adjustable counter means to transmit error count readings to said display means.

14. A system according to claim 10 with fail-safe means responsive to the absence of a scanner pulse in a given cycle of said adjustable counting means to signal a fail-safe condition.

15. A system according to claim 14 with said fail-safe means being responsive to a predetermined excessive error count of said error-counting means to initiate the fail-safe condition.

16. A system according to claim 10 with fail-safe means coupled to said error-counting means and responsive to an excessive error count to signal a fail-safe condition.

17. A system according to claim 10 with said error-counting means including a digital comparator circuit for signalling which of a respective reference pulse and a corresponding scanner signal is first to occur, and said display means being controlled by said comparator circuit to display the polarity of said error readout.

18. A system according to claim 10 with a position detector operated in synchronism with said work-applying means to cyclically supply a detector pulse for resetting said adjustable counting means.

19. A system according to claim 18 with a pulse-counting means connected to said position detector for emitting control pulses at a submultiple of the rate of the detector pulses, and said display means being operative to read and display the error count in response to each control pulse.

20. A registration error measuring system for measuring the distance of an misregistration between a moving work-receiving means and work applied thereto by a work-applying means substantially coordinated in its operation with the movement of such work-receiving means, comprising:
   a. scanning means cooperable with said work-receiving means for scanning the same to produce successive scanner signals which are precisely correlated with the instantaneous position of said work-receiving means,
   b. encoder means substantially synchronized with the operation of said work-applying means for generating encoder pulses having a repetition rate substantially proportionally related to the rate of operation of said work-applying means,
   c. adjustable counting means for counting and responding to an adjustable number of said encoder pulses and for cyclically resetting in response to the operation of said work-applying means for providing a series of reference pulses substantially precisely coordinated with the operation of said work-applying means relative to said work-receiving means and which are to be time coincident with the respective scanner signals when the work-applying means is in registration with said work-receiving means,
   d. error-counting means for receiving both said reference pulses and said scanner signals, and f0r counting the number of encoder pulses which occur in any interval between the occurrence of a respective one of said reference pulses and a corresponding one of said scanner signals, to provide error count in successive cycles of said adjustable counting means, and
   e. analog error means coupled to said error-counting means for providing an analog error signal of magnitude in accordance with the magnitude of each successive error count.

21. A system according to claim 20 with said error-counting means including a comparator circuit for providing a polarity signal in accordance with which a respective reference pulse and the corresponding scanner signal is first to occur.

22. Apparatus for detecting and measuring errors in register between repetitive patterns of work, including spaced register indicia, on a moving web of material and other repetitive patterns of work subsequently applied to the web by a rotary member l0cated along the path of web travel and operated at a peripheral speed substantially corresponding to the linear speed of the web, said apparatus comprising a web scanner constructed and arranged to detect the occurrence of sad indicia on the web adjacent to the locus of said rotary member and to provide a series of scanner pulses in response t0 scanning of the successive indicia, detector pulses being produced as a function of the cyclical operation of the rotary member on the web, and encoder pulses being generated in accordance with successive uniform increments of travel of the web, characterized in that a counting chain for counting encoder pulses is provided having sufficient capacity so that a reference pulse can be generated a required number of encoder pulses after the occurrence of one of the first mentioned pulses so as to define by its time coincidence with the other of the first mentioned pulses the condition of register between the respective patterns of work applied to the web, without requiring any mechanical adjustment of the system.

23. Apparatus according to claim 22 with said counter chain being operable in set up mode to count the number of encoder pulses occurring in the time interval between a detector pulse and a scanner pulse, and said counting chain including an adjustable counter which is set to a count in accordance with the number of encoder pulses occurring in such time interval under conditions of register, thereby to provide said reference pulse in operating mode of the system.

24. Apparatus in accordance with claim 23 with digital display means selectively connectable to the counting chain to display the count registered.

25. Apparatus according to claim 22 with said adjustable counter having a sufficient counting capacity so that a properly timed reference pulse can be generated for any possible time interval between detector and scanner pulses, thereby to avoid the need for mechanical adjustment of the system.

26. Apparatus according to claim 22 with error-counting means for counting encoder pulses as a measure of any error in coincidence of the reference pulse and the other of the first-mentioned pulses, and digital display means connected to the error-counting means for displaying the error count therein.

27. Apparatus according to claim 26 with the display means displaying an average of a series of error counts of the error-counting means.

28. Apparatus according to claim 26 with the display means providing for the display of the error count at a sampling rate equal to a submultiple of the rate operation of the error-counting means.

29. Apparatus according to claim 26 with the display means comprising a plurality of electronic digital display tubes and a similar tube which displays a sign indicative of the polarity or any error count.